United States Patent
Orii et al.

(10) Patent No.: US 9,656,462 B2
(45) Date of Patent: May 23, 2017

(54) LIQUID EJECTING APPARATUS

(71) Applicant: Seiko Epson Corporation, Tokyo (JP)

(72) Inventors: Hiromitsu Orii, Azumino (JP); Toru Matsuyama, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/246,658

(22) Filed: Aug. 25, 2016

(65) Prior Publication Data

US 2017/0057220 A1 Mar. 2, 2017

(30) Foreign Application Priority Data

Aug. 26, 2015 (JP) ................................. 2015-166697

(51) Int. Cl.
*B41J 2/045* (2006.01)
*B41J 2/01* (2006.01)
*G06K 7/10* (2006.01)
*H01S 3/10* (2006.01)

(52) U.S. Cl.
CPC ......... *B41J 2/0455* (2013.01); *B41J 2/04581* (2013.01); *B41J 2/01* (2013.01); *G06K 2007/10495* (2013.01); *H01S 3/10038* (2013.01)

(58) Field of Classification Search
CPC ........ B41J 2/0455; B41J 2/04581; B41J 2/01; G06K 2007/10495; H01S 3/10038
See application file for complete search history.

(56) References Cited

U.S. PATENT DOCUMENTS

| 7,852,128 B2 | 12/2010 | Kitazawa et al. |
| 2014/0098385 A1* | 4/2014 | Endo ................... B41J 2/04581 358/1.2 |

FOREIGN PATENT DOCUMENTS

| JP | 2009-190287 A | 8/2009 |
| JP | 2010-114711 A | 5/2010 |

* cited by examiner

*Primary Examiner* — Alessandro Amari
*Assistant Examiner* — Yaovi M Ameh
(74) *Attorney, Agent, or Firm* — Harness, Dickey & Pierce, P.L.C.

(57) ABSTRACT

A liquid ejecting apparatus which includes a modulation circuit which generates a modulated signal; a transistor which generates an amplified-modulated signal; a low pass filter which generates a driving signal; a thermistor; a control section which controls printing; and a multilayered circuit board on which the modulation circuit, the transistor, and the low pass filter are mounted, in which the modulation circuit generates the modulated signal by feeding back a signal based on any one of the modulated signal, the amplified-modulated signal, and the driving signal, the multilayered circuit board has a multilayer structure of three layers or more, a feedback wiring pattern which feeds back any one of the modulated signal, the amplified-modulated signal, and the driving signal to the modulation circuit, and a temperature wiring pattern which electrically connects the thermistor and the control section does not intersect the feedback wiring pattern when viewed planarly.

4 Claims, 15 Drawing Sheets

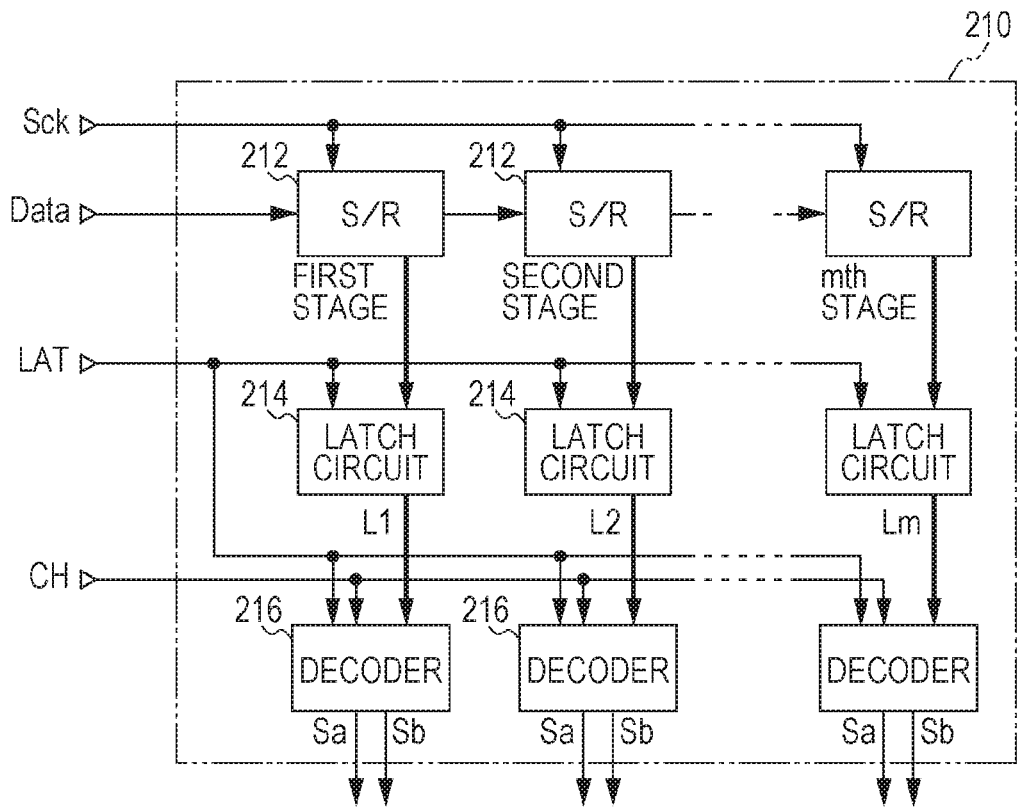

⟨FIRST LAYER (SURFACE LAYER)⟩

<SECOND LAYER>

⟨THIRD LAYER⟩

<FOURTH LAYER>

<EQUIVALENT CIRCUIT>

<PIN ASSIGNMENT OF LSI> ically, as a printing apparatus which prints an image or a document by causing ink to be ejected from nozzles, an apparatus in which a piezoelectric element is used has been known. The piezoelectric elements are provided corresponding to a plurality of nozzles in a head unit, respectively, cause ink (liquid) of a predetermined amount to be ejected from nozzles at a predetermined timing by being driven, respectively, according to a driving signal, thereby forming dots. Since the piezoelectric element is a capacitive load such as a capacitor in an electrical view, it is necessary to supply sufficient currents in order to operate the piezoelectric element in each nozzle.

LIQUID EJECTING APPARATUS

This application claims priority to Japanese Patent Application No. 2015-166697 filed on Aug. 26, 2015. The entire disclosure of Japanese Patent Application No. 2015-166697 is hereby incorporated herein by reference.

BACKGROUND

1. Technical Field

The present invention relates to a liquid ejecting apparatus which ejects liquid such as ink from nozzles.

2. Related Art

As a liquid ejecting apparatus, typically, as a printing apparatus which prints an image or a document by causing ink to be ejected from nozzles, an apparatus in which a piezoelectric element is used has been known. The piezoelectric elements are provided corresponding to a plurality of nozzles in a head unit, respectively, cause ink (liquid) of a predetermined amount to be ejected from nozzles at a predetermined timing by being driven, respectively, according to a driving signal, thereby forming dots. Since the piezoelectric element is a capacitive load such as a capacitor in an electrical view, it is necessary to supply sufficient currents in order to operate the piezoelectric element in each nozzle.

For this reason, a liquid ejecting apparatus in the related art has a configuration in which a piezoelectric element is driven, by supplying a driving signal which is obtained by amplifying a source signal in an amplifying circuit to the head unit. For the amplifying circuit, there is a method in which a source signal before being amplified is subjected to current amplification using class AB amplification, or the like (linear amplification, refer to JP-A-2009-190287). However, since power consumption is large, and energy efficiency is not good in linear amplification, class D amplification has been also proposed in recent years (refer to JP-A-2010-114711).

Incidentally, high speed printing or high resolution printing is highly desired in a printing apparatus, and in order to execute high speed printing, the number of dots which can be formed per unit hour may be increased. In addition, in order to execute high resolution printing, an amount of ink which is ejected from nozzles may be set to be small, and the number of dots which can be formed per unit area may be increased. That is, the number of dots which can be formed per unit hour and per unit area may be increased in order to execute high speed printing and high resolution printing, and for this reason, a method in which an ink ejecting frequency is increased is adopted.

In order to increase the ink ejecting frequency, it is necessary to increase a frequency of a driving signal which is supplied to a piezoelectric element. In order to cause ink to be stably ejected, by increasing a frequency of a driving signal, it is necessary to increase a switching frequency in class D amplification.

However, when increasing the switching frequency, a loss due to switching becomes large, and after all, energy efficiency in the class D amplification becomes lower than that in linear amplification, and it is not possible to obtain high energy efficiency which is an advantage of the class D amplification. Moreover, in a case in which switching in the class D amplification is set to a high frequency, there also is a problem of an erroneous operation due to noise.

When a switching frequency in the class D amplification is increased in order to increase a frequency of a driving signal which drives a piezoelectric element in this manner, it will cause many problems.

SUMMARY

An advantage of some aspects of the invention is to provide a liquid ejecting apparatus in which it is possible to execute high speed printing and high resolution printing in a configuration in which a piezoelectric element is driven using a driving signal which is subjected to class D amplification.

According to an aspect of the invention, there is provided a liquid ejecting apparatus which includes a modulation circuit which generates a modulated signal obtained by performing pulse modulation with respect to a source signal; a transistor which generates an amplified-modulated signal by amplifying the modulated signal; a low pass filter which generates a driving signal by planarizing the amplified-modulated signal; a piezoelectric element which is displaced when being applied with the driving signal; a cavity of which an internal volume varies due to displacement of the piezoelectric element; a nozzle which is provided in order to cause liquid in the cavity to be ejected according to a change in the internal volume of the cavity; a thermistor which is provided in order to detect a temperature of the transistor; a control section which controls printing according to the temperature which is detected by the thermistor; and a multilayered circuit board on which the modulation circuit, the transistor, and the low pass filter are mounted, in which the modulation circuit generates the modulated signal by feeding back a signal based on any one of the modulated signal, the amplified-modulated signal, and the driving signal, the multilayered circuit board has a multilayer structure of three layers or more including at least one layer other than two surface layers, a feedback wiring pattern which feeds back any one of the modulated signal, the amplified-modulated signal, and the driving signal to the modulation circuit is provided on the one layer, and a temperature wiring pattern which electrically connects the thermistor and the control section does not intersect the feedback wiring pattern when viewed planarly.

In the liquid ejecting apparatus according to the aspect, it is possible to output a driving signal in which a source signal is reliably reproduced due to feedback through the feedback wiring pattern. In addition, it is possible to set a modulated signal (amplified-modulated signal) as a switching signal to a high frequency when a delay element of the driving signal which is fed back is small. For this reason, it is possible to execute high speed printing and high resolution printing by increasing a frequency of a driving signal which is applied to a piezoelectric element. Since the feedback wiring pattern does not intersect the temperature wiring pattern, it is possible to suppress a negative influence due to mutual interference, or the like, between both of the wiring patterns.

Since the driving signal is a signal which is obtained by planarizing an amplified-modulated signal, the signal has large voltage amplitude. For this reason, it is preferable to obtain a deviation between the driving signal and a source signal after attenuating the driving signal, for example, not directly obtaining the deviation between the driving signal and the source signal. A signal based on a driving signal is a signal which indirectly denotes the driving signal in this manner, without directly denoting the driving signal. In addition, as a feedback signal, it is possible to use a modulated signal (amplified-modulated signal), in addition to the driving signal.

A source signal is a signal as a source of a driving signal which regulates a displacement of a piezoelectric element, that is, a signal before modulating, and a signal as a reference of a waveform of the driving signal (regardless of analog or digital, including signal for regulating). A modulated signal is a digital signal which is obtained by performing pulse modulation with respect to the source signal (for example, pulse width modulation, pulse density modulation, or the like).

A low pass filter is typically configured, using an inductor (coil) and a capacitor, and a resistor may be added thereto. The low pass filter may be configured, using a resistor and a capacitor without an inductor.

In the liquid ejecting apparatus according to the aspect, a driving signal is generated by planarizing the amplified-modulated signal, the piezoelectric element is displaced by applying the driving signal, and liquid is caused to be ejected from a nozzle. Here, when the liquid ejecting apparatus analyzes a waveform of a driving signal for ejecting a small dot, for example, using a frequency spectrum, it is determined that a frequency component of 50 kHz or more is included. In order to generate a driving signal including such a frequency component of 50 kHz or more, it is necessary to set a frequency of a modulated signal (amplified-modulated signal) to 1 MHz or more.

If a frequency of a modulated signal is set to be lower than 1 MHz, an edge of a waveform of a driving signal which is reproduced becomes dull and round. In other words, a rough edge is smoothed down, and the waveform becomes dull. When the waveform of the driving signal becomes dull, a displacement of a piezoelectric element which is operated according to rising and falling edges of a waveform becomes moderate, tailing at a time of ejecting, an ejecting failure, or the like, occurs, and printing quality deteriorates.

Meanwhile, when a frequency of the modulated signal is set to be higher than 8 MHz, a resolving power of a waveform of the driving signal becomes high. However, a switching loss becomes large when a switching frequency in a transistor increases, and a power saving performance, and a performance of saving heat generation which are superior to linear amplification such as class AB amplification deteriorate.

In the liquid ejecting apparatus according to the aspect, it is preferable to set a frequency of the modulated signal to 1 MHz or more and 8 MHz or less.

In the liquid ejecting apparatus according to the aspect, an upper layer or a lower layer of the feedback wiring pattern may be a ground pattern. According to the configuration, since the feedback wiring pattern is interposed by the ground pattern (through insulating material), it is possible to increase a shielding effect.

The upper layer or the lower layer denotes a relationship in which the layers are relatively regulated in a stacking direction of a wiring layer in a multilayered board, and are not regulated in a gravity direction.

In the liquid ejecting apparatus according to the aspect, the feedback wiring pattern may be surrounded with a ground pattern in the one layer. According to the configuration, it is possible to increase a shielding effect, since the feedback wiring pattern is surrounded with the ground pattern on the same layer.

The invention can be executed in various aspects, and can be executed in various aspects of a control method of the liquid ejecting apparatus, a single body of a head unit, or the like, for example.

BRIEF DESCRIPTION OF THE DRAWINGS

The invention will be described with reference to the accompanying drawings, wherein like numbers reference like elements.

FIG. 6 is a diagram which illustrates a configuration of the selection control section in the head unit.

FIG. 7 is a diagram which illustrates decoding contents of a decoder in the head unit.

DESCRIPTION OF EXEMPLARY EMBODIMENTS

Hereinafter, an embodiment for executing the invention will be described with reference to drawings.

A printing apparatus according to the embodiment is a liquid ejecting apparatus which forms an ink dot group on a medium such as paper, by causing ink to be ejected according to image data which is supplied from an external host computer, and prints an image (including characters, figures, or the like) corresponding to the image data in this manner.

Figure 1:
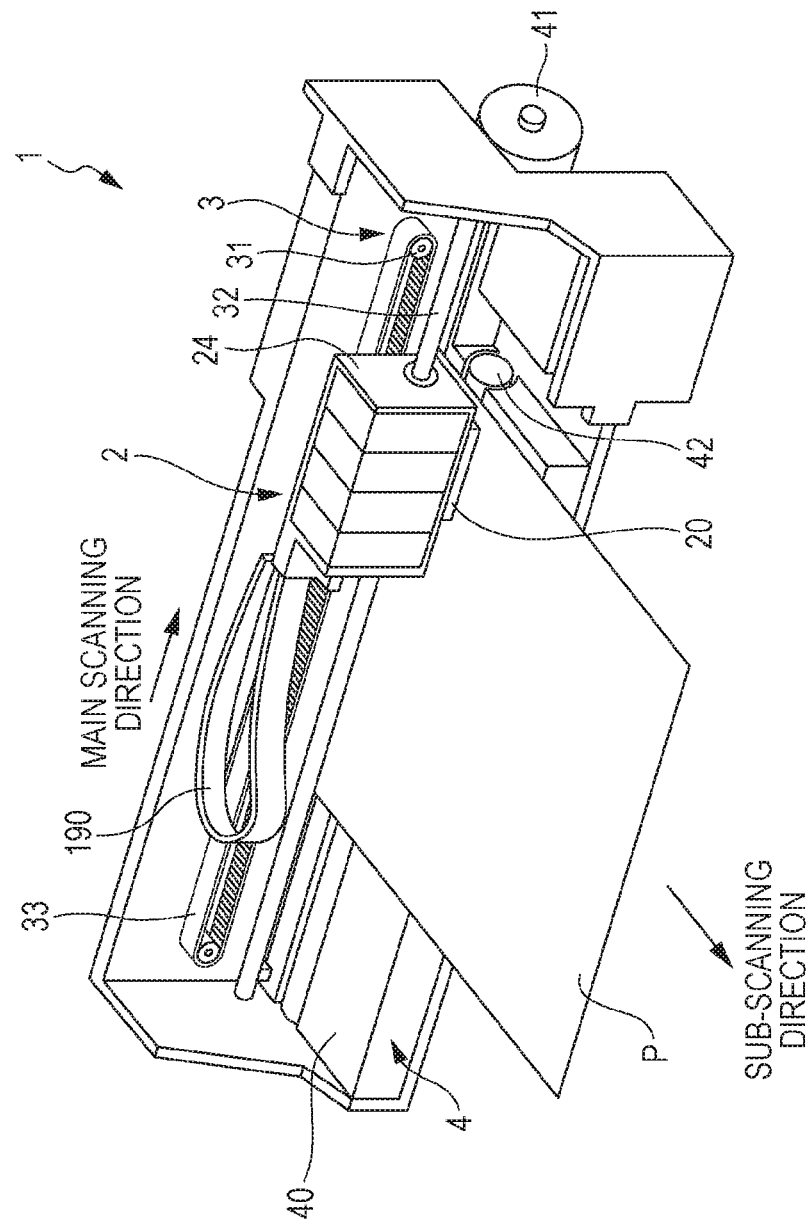
FIG. 1 is a diagram which illustrates a schematic configuration of a printing apparatus.

FIG. 1 is a perspective view which illustrates a schematic configuration of the inside of the printing apparatus.

As illustrated in the figure, a printing apparatus is provided with a movement mechanism 3 which causes a moving object 2 to move (reciprocating) in a main scanning direction.

The movement mechanism 3 includes a carriage motor 31 as a driving source of the moving object 2, a carriage guiding shaft 32 of which both ends are fixed, and a timing belt 33 which extends approximately in parallel to the carriage guiding shaft 32, and is driven by the carriage motor 31.

A carriage 24 of the moving object 2 is supported by the carriage guiding shaft 32 so as to reciprocate, and is fixed to a part of the timing belt 33. For this reason, when the timing belt 33 is subjected to forward-reverse driving by the carriage motor 31, the moving object 2 is guided by the carriage guiding shaft 32, and reciprocates.

A head unit 20 is provided at a portion of the moving object 2 which faces a medium P. As described later, the head unit 20 causes ink droplets (liquid droplets) to be ejected from a plurality of nozzles, and has a configuration in which various control signals are supplied through a flexible cable 190.

The printing apparatus 1 is provided with a transport mechanism 4 which transports the medium P on a platen 40 in a sub-scanning direction. The transport mechanism 4 is provided with a transport motor 41 as a driving source, and a transport roller 42 which is rotated by the transport motor 41, and transports the medium P in the sub-scanning direction.

An image is formed on the surface of the medium P when the head unit 20 ejects ink droplets on the medium P at a timing in which the medium P is transported by the transport mechanism 4.

Figure 2:
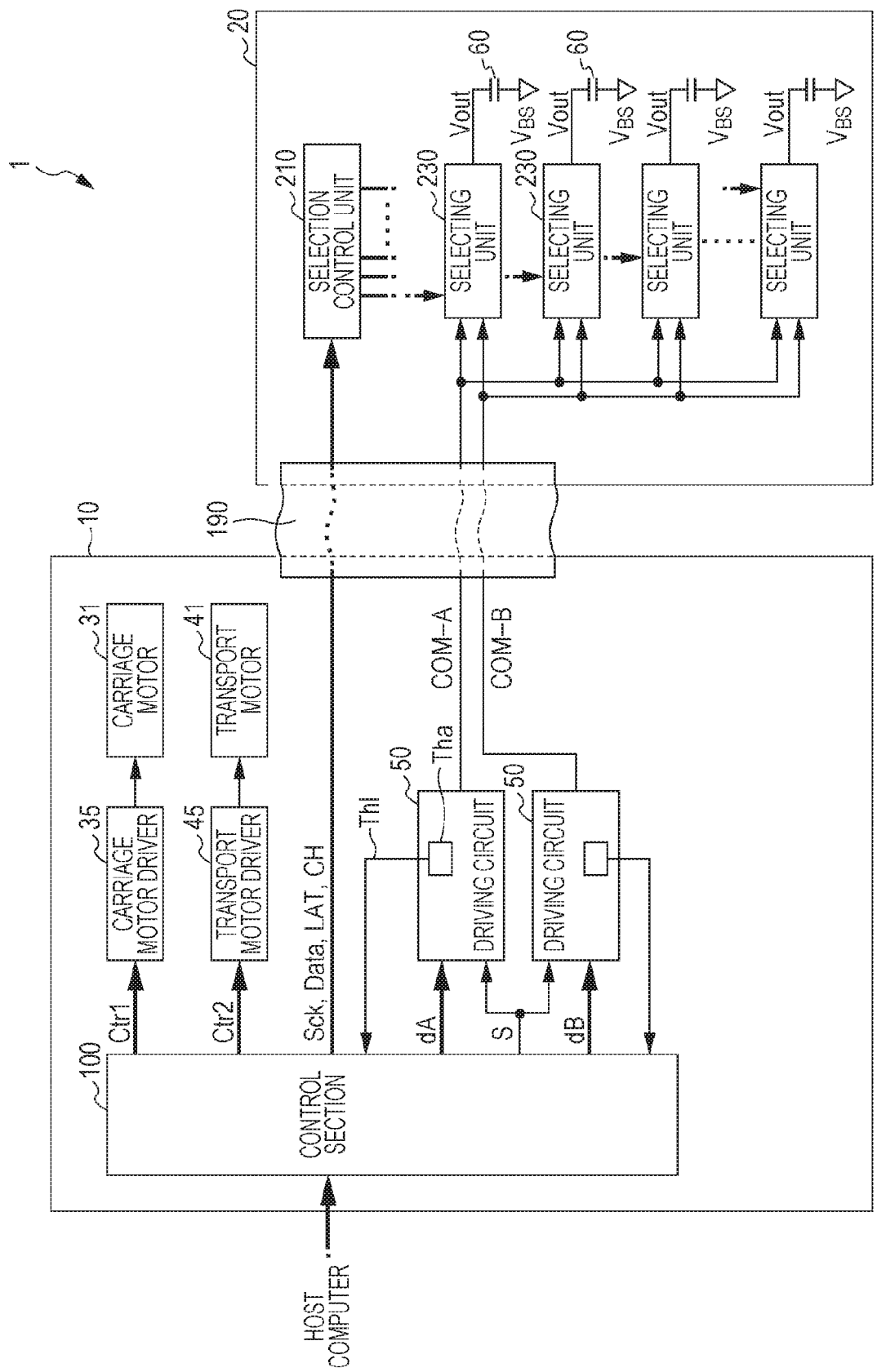
FIG. 2 is a block diagram which illustrates a configuration of the printing apparatus.

FIG. 2 is a block diagram which illustrates an electrical configuration of the printing apparatus.

As illustrated in the figure, in a printing apparatus 1, a control unit 10 and the head unit 20 are connected through the flexible cable 190.

The control unit 10 includes a control section 100, the carriage motor 31, a carriage motor driver 35, the transport motor 41, a transport motor driver 45, and two driving circuits 50 which include a thermistor Tha. Among these, the control section 100 is a type of a microcomputer which includes a CPU, a storage unit, or the like, and outputs various control signals, and the like, which control each unit by executing a predetermined program, when image data which regulates an image to be formed on the medium P is supplied from the host computer, or the like.

In detail, first, the control section 100 supplies a control signal Ctr1 to the carriage motor driver 35, and the carriage motor driver 35 drives the carriage motor 31 according to the control signal Ctr1. In this manner, a movement in the main scanning direction with respect to the carriage 24 is controlled.

Secondly, the control section 100 supplies a control signal Ctr2 to the transport motor driver 45, and the transport motor driver 45 drives the transport motor 41 according to the control signal Ctr2. In this manner, a movement in the sub-scanning direction using the transport mechanism 4 is controlled.

Thirdly, the control section 100 supplies digital data dA which regulates a waveform of a driving signal COM-A to one of the two driving circuits 50, and supplies digital data dB which regulates a driving signal COM-B to the other, in synchronization with driving of the carriage motor 31 through the control signal Ctr1. The data items dA and dB are stored in the storage unit in advance, for example, are read at intervals synchronized with driving of the carriage motor 31 using the control section 100, and are supplied to the respective driving circuits 50.

The one driving circuit 50 performs class D amplification with respect to data dA after performing an analog conversion, and supplies a signal which is amplified to the head unit 20 as the driving signal COM-A. The thermistor Tha which is included in the one driving circuit 50 detects a temperature of a transistor which is used in the class D amplification, and supplies the temperature information to the control section 100 through the temperature wiring pattern Thl.

The other driving circuit 50 performs class D amplification with respect to the data dB after performing an analog conversion, and supplies the amplified signal to the head unit 20 as the driving signal COM-B. It is similar in a point that the thermistor included in the other driving circuit 50 detects a temperature, and supplies the temperature information to the control section 100.

The detail of the driving circuit 50 will be described later. The control section 100 instructs a stop using the control signal S when a temperature detected in any one of the thermistors is a threshold value or more.

Fourthly, the control section 100 supplies a clock signal Sck, a data signal Data, control signals LAT and CH to the head unit 20.

Meanwhile, the head unit 20 includes a selection control section 210, and a plurality of sets of selecting units 230 and piezoelectric elements 60.

The selection control section 210 instructs the respective selecting units 230 whether to select the driving signal COM-A or the driving signal COM-B (or select neither of signals) using a control signal, or the like, which is supplied from the control section 100, and the selecting unit 230 selects the driving signal COM-A or the driving signal COM-B according to an instruction of the selection control section 210, and supplies the signal to one end of the respective piezoelectric elements 60 as a driving signal. In the figure, a voltage of the driving signal is denoted by Vout.

In the example, the other ends of the respective piezoelectric elements 60 are commonly applied with a voltage $V_{BS}$.

The piezoelectric element 60 is provided corresponding to a respective plurality of nozzles in the head unit 20. In addition, the piezoelectric element 60 causes ink to be ejected by being displaced according to a difference between the voltage Vout and the voltage $V_{BS}$ of a driving signal which is selected by the selecting unit 230. Therefore, subsequently, a configuration in which ink is ejected due to driving with respect to the piezoelectric element 60 will be simply described.

Figure 3:
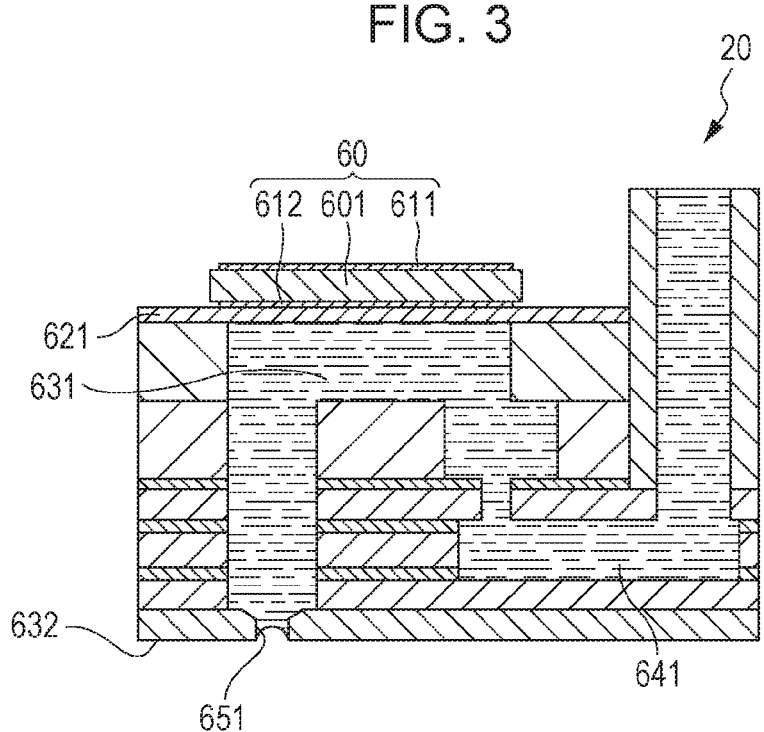
FIG. 3 is a diagram which illustrates a configuration of an ejecting unit in a head unit.

FIG. 3 is a diagram which illustrates a schematic configuration corresponding to one nozzle in the head unit 20.

As illustrated in the figure, the head unit 20 includes the piezoelectric element 60, a vibrating plate 621, a cavity (pressure chamber) 631, a reservoir 641, and a nozzle 651. Among these, the vibrating plate 621 is displaced (bending vibration) due to the piezoelectric element 60 which is provided on a top face in the figure, and functions as a diaphragm which enlarges or contracts an internal volume of the cavity 631 which is filled with ink. The nozzle 651 is an opening hole portion which is provided in a nozzle plate 632, and communicates with the cavity 631.

The piezoelectric element 60 illustrated in the figure has a structure in which a piezoelectric substance 601 is interposed between a pair of electrodes 611 and 612. In the piezoelectric substance 601 with the structure, a center portion in the figure bends in the vertical direction with respect to both end portions along with the electrodes 611 and 612, and the vibrating plate 621 according to a voltage applied by the electrodes 611 and 612. Specifically, the piezoelectric element 60 bends upward when a voltage Vout of a driving signal increases, and on the other hand, bends downward when the voltage Vout decreases. In this configuration, when the piezoelectric element bends upward, ink is drawn into the cavity from the reservoir 641, since the internal volume of the cavity 631 enlarges, and on the other hand, when the piezoelectric element bends downward, since the internal volume of the cavity 631 contracts, ink is ejected from the nozzle 651 depending on a degree of the contraction. For this reason, an ejecting unit which ejects ink is configured by the piezoelectric element 60, the cavity 631, and the nozzle 651.

The piezoelectric element 60 may be a type which can cause liquid such as ink to be ejected by deforming the piezoelectric element 60, without being limited to the illustrated structure. In addition, the piezoelectric element 60 may have a configuration in which a vertical vibration is used without being limited to bending vibration.

The piezoelectric element 60 is provided corresponding to the cavity 631 and the nozzle 651 in the head unit 20, and the piezoelectric element 60 is provided also corresponding to the selecting unit 230 in FIG. 2. For this reason, a set of the piezoelectric element 60, the cavity 631, the nozzle 651, and the selecting unit 230 is provided in each nozzle 651 (ejecting unit).

Figure 4A:
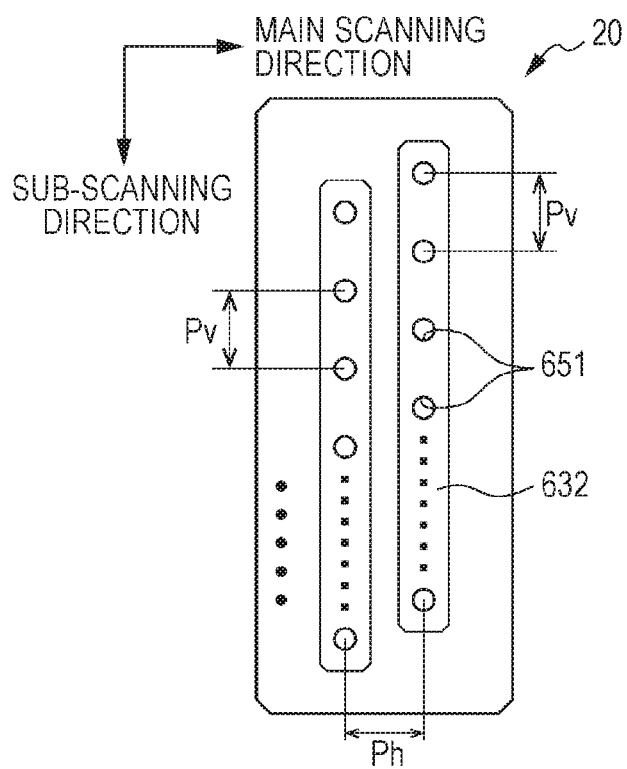
FIG. 4A is a diagram which illustrates a nozzle arrangement in the head unit.

FIG. 4A is a diagram which illustrates an example of arrangement of the nozzles 651.

As illustrated in the figure, the nozzles 651 are arranged in two columns as described below, for example. Specifically, when viewing one column, a plurality of the nozzles 651 are arranged at a pitch Pv along the sub-scanning direction, and meanwhile, when viewing two columns, the nozzles are separated by a pitch Ph in the main scanning direction, and are in a relationship of being shifted by a half of the pitch Pv in the sub-scanning direction.

In a case of color printing, in the nozzle 651, patterns corresponding to each of colors of C (cyan), M (magenta), Y (yellow), K (black), and the like, are provided along the main scanning direction, for example; however, in the following descriptions, for simplification, a case in which gradation is expressed, using a single color will be described.

Figure 4B:
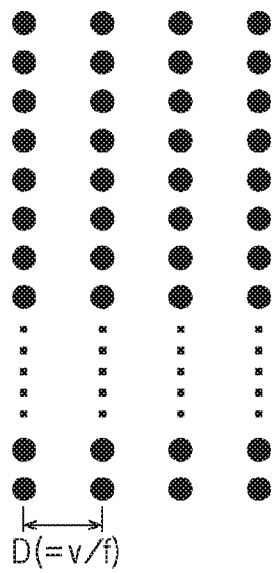
FIG. 4B is a diagram which describes dots which are formed by the ejecting unit.

FIG. 4B is a diagram which describes basic resolution of an image formation using a nozzle arrangement which is illustrated in FIG. 4A. The figure is an example of a method of forming one dot (first method) by causing ink droplets to be ejected once from the nozzle 651, in order to simplify descriptions, and black circles denote dots which are formed due to landing of ink droplets.

When the head unit 20 moves in the main scanning direction at a speed of v, as illustrated in the figure, an interval D (in main scanning direction) of dots which are formed due to landing of ink droplets, and the speed v are in the following relationship.

That is, in a case in which one dot is formed due to ejecting of ink of one time, the interval D of dots is denoted by a value (=v/f) which is obtained by dividing the speed v by an ink ejecting frequency f, in other words, a movement distance of the head unit 20 in a cycle (1/f) in which ink droplets are repeatedly ejected.

In the example in FIG. 4B, ink droplets which are ejected from the nozzles 651 of two columns are landed on the medium P so as to be aligned on the same column, in a relationship in which the pitch Ph is proportional to the interval D using a coefficient n. For this reason, as illustrated in FIG. 4B, a dot interval in the sub-scanning direction becomes a half of the dot interval in the main scanning direction. It is needless to say that the dot arrangement is not limited to the illustrated example.

Incidentally, in order to execute high speed printing, the movement speed v of the head unit 20 in the main scanning direction may be increased, in a simple way. However, the interval D of dots becomes long merely by increasing the speed v. For this reason, in order to execute high speed printing after securing resolution to some extent, it is necessary to increase the number of dots which is formed per unit hour by increasing the ink ejecting frequency f.

In order to increase resolution, separately from printing speed, the number of dots which is formed per unit hour may be increased. However, when ink is not set to a small amount in a case of increasing the number of dots, not only adjacent dots are combined, but also printing speed decreases, when the ink ejecting frequency f is not increased.

In this manner, in order to execute high speed printing and high resolution printing, it is necessary to increase the ink ejecting frequency f, as described above.

Meanwhile, as a method of forming dots on the medium P, there is a method of forming one dot (second method) by combining one or more ink droplets which are landed, by causing the one or more ink droplets which are ejected in a unit period to land, or a method of forming two or more dots (third method) without combining the two or more ink droplets, by setting ink droplets to be ejected two times or more in a unit period, in addition to a method of forming one dot by causing ink droplets to be ejected once. In the following descriptions, a case in which dots are formed by using the second method will be described.

In the embodiment, the second method will be described by assuming the following example. That is, in the embodiment, one dot is expressed in four gradations of a large dot, a medium dot, a small dot, and non-recording by causing ink to be ejected two times at maximum. In order to express the four gradations, according to the embodiment, two types of driving signals of COM-A and COM-B are prepared, and the first half pattern and the second half pattern are provided in one cycle in each of the driving signals. A configuration in which the driving signal COM-A or COM-B is selected (or not selected) according to a gradation to be expressed, in the first half and the second half in one cycle, and is supplied to the piezoelectric element 60 is adopted.

Therefore, the driving signals COM-A and COM-B will be described, and a configuration for selecting the driving signal COM-A or COM-B will be described thereafter. The driving signals COM-A and COM-B are generated by the driving circuit 50, respectively, and for convenience, the driving circuit 50 will be described after describing the configuration for selecting the driving signal COM-A or COM-B.

Figure 5:
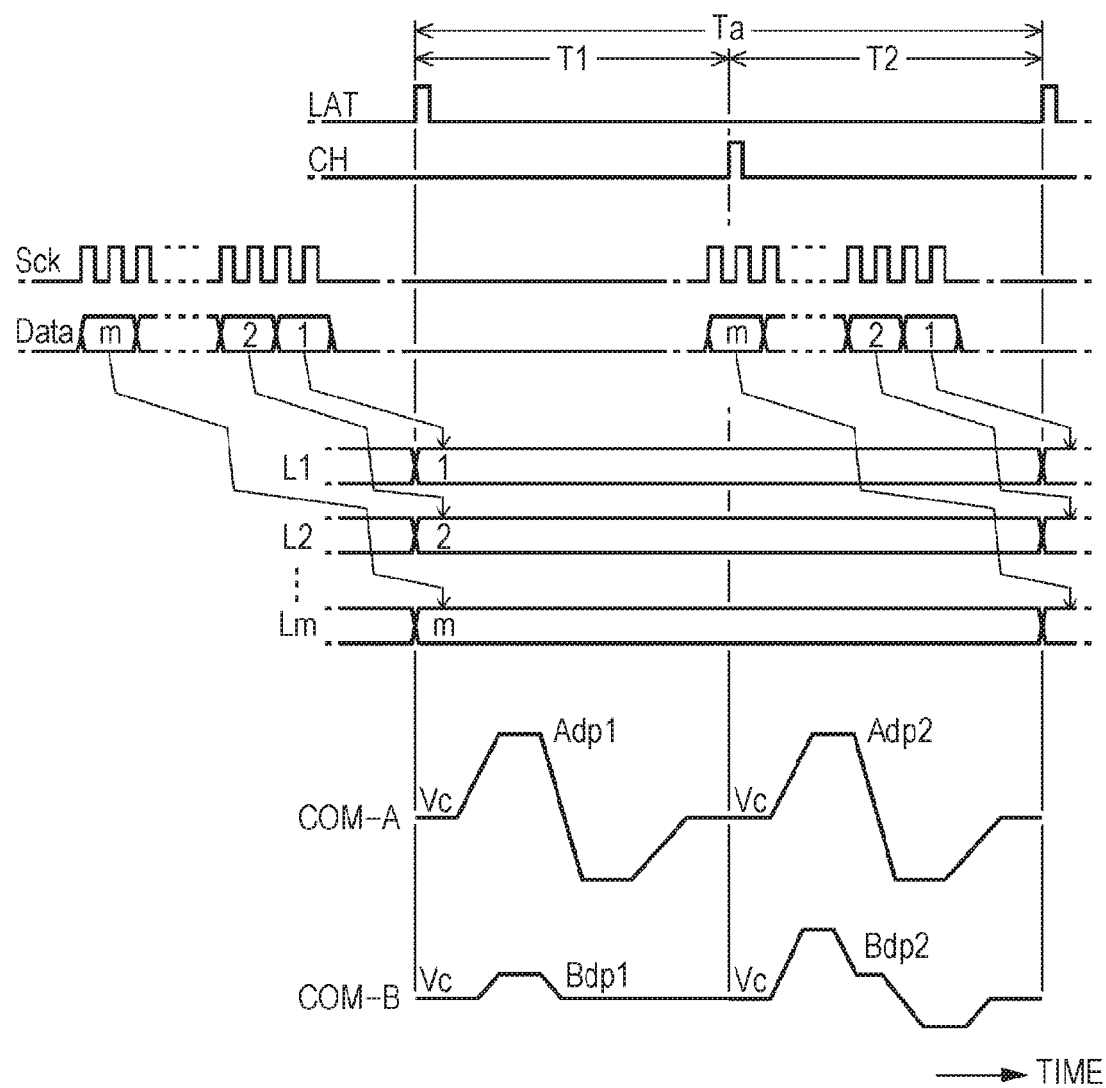
FIG. 5 is a diagram which describes an operation of a selection control section in the head unit.

FIG. 5 is a diagram which illustrates waveforms of the driving signals COM-A and COM-B, or the like.

As illustrated in the figure, the driving signal COM-A is formed in a waveform in which a trapezoidal waveform Adp1 which is disposed in a period T1 from outputting (rising) of the control signal LAT to outputting of the control signal CH, in a printing period Ta, and a trapezoidal waveform Adp2 which is disposed in a period T2 from outputting of the control signal CH to outputting of the subsequent control signal LAT, in the printing period Ta are continuously repeated.

In the embodiment, the trapezoidal waveforms Adp1 and Adp2 are approximately the same waveform as each other, and when it is assumed that the respective waveforms are supplied to one end of the piezoelectric element 60, the trapezoidal waveforms are waveforms which causes ink of a predetermined amount, specifically, ink of a moderate amount to be ejected from nozzles 651 corresponding to the piezoelectric element 60, respectively.

The driving signal COM-B is formed in a waveform in which a trapezoidal waveform Bdp1 which is disposed in the period T1 and a trapezoidal waveform Bdp2 which is disposed in the period T2 are continuously repeated. In the embodiment, the trapezoidal waveforms Bdp1 and Bdp2 are different from each other. In these, the trapezoidal waveform Bdp1 is a waveform which prevents an increase in viscosity of ink by causing ink in the vicinity of the opening hole portion of the nozzle 651 to minutely vibrate. For this reason, even when the trapezoidal waveform Bdp1 is supplied to one end of the piezoelectric element 60, ink droplets are not ejected from the nozzle 651 corresponding to the piezoelectric element 60. The trapezoidal waveform Bdp2 is a waveform which is different from the trapezoidal waveform Adp1 (Adp2). The trapezoidal waveform is a waveform which causes ink of an amount smaller than the above described predetermined amount to be ejected from a nozzle 651 corresponding to the piezoelectric element 60, when it is assumed that the trapezoidal waveform Bdp2 is supplied to one end of the piezoelectric element 60.

Both a voltage at a start timing and a voltage at an ending timing of the trapezoidal waveforms Adp1, Adp2, Bdp1, and Bdp2 are a voltage Vc, and common. That is, the trapezoidal waveforms Adp1, Adp2, Bdp1, and Bdp2 are waveforms which start in the voltage Vc, and end in the voltage Vc, respectively.

FIG. 6 is a diagram which illustrates a configuration of the selection control section 210 in FIG. 2.

As illustrated in the figure, the clock signal Sck, the data signal Data, and the control signals LAT and CH are supplied to the selection control section 210 from the control unit 10. A group of a shift register (S/R) 212, a latch circuit 214, and a decoder 216 is provided in the selection control section 210, by corresponding to respective piezoelectric elements 60 (nozzle 651).

When forming one dot of an image, the data signal Data regulates a size of the dot. According to the embodiment, the data signal Data is configured of two bits of a high-order bit (MSB) and a low-order bit (LSB), in order to express four gradations of non-recording, a small dot, a medium dot, and a large dot.

The data signal Data is supplied to each nozzle from the control section 100 in series, in accordance with main scanning of the head unit 20, in synchronization with the clock signal Sck. The shift register 212 is configured so as to temporarily hold two bits of the data signal Data corresponding to nozzles, which is supplied in series.

In detail, it is a configuration in which the shift registers 212 with the number of stages corresponding to the piezoelectric element 60 (nozzle) are vertically connected to each other, and the data signal Data which is supplied in series is sequentially transmitted to the rear stage according to the clock signal Sck.

When the number of piezoelectric elements 60 is set to m (m is plural number), in order to distinguish the shift register 212, the shift register is denoted by the first stage, the second stage, . . . , the mth stage in order, from the upstream side on which the data signal Data is supplied.

The latch circuit 214 latches the data signal Data which is held in the shift register 212 using rising of the control signal LAT.

The decoder 216 decodes the data signal Data of two bits which is latched by the latch circuit 214, outputs selection signals Sa and Sb in each period of T1 and T2 which is regulated by the control signal LAT and the control signal CH, and regulates a selection in the selecting unit 230.

FIG. 7 is a diagram which illustrates decoding contents in the decoder 216.

In the figure, the latched printing data Data of two bits are denoted by MSB and LSB. When the latched printing data Data is (0, 1), for example, it means that the decoder 216 sets logic levels of the selection signals Sa and Sb to an H level and an L level, respectively, in the period T1, and to the L level and the H level, respectively, in the period T2, and outputs thereof.

The logic level of the selection signals Sa and Sb is level-shifted to high-amplitude logic using a level shifter (not illustrated), compared to logic levels of the clock signal Sck, the printing data Data, and the control signals LAT and CH.

Figure 8:
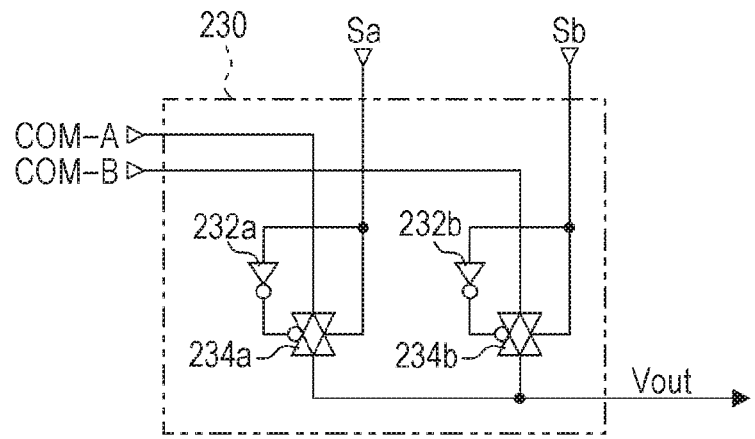
FIG. 8 is a diagram which illustrates a configuration of a selecting unit in the head unit.

FIG. 8 is a diagram which illustrates a configuration of the selecting unit 230 corresponding to one piezoelectric element 60 (nozzle 651) in FIG. 2.

As illustrated in the figure, the selecting unit 230 includes inverters (NOT circuit) 232a and 232b, and transfer gates 234a and 234b.

The selection signal Sa from the decoder 216 is supplied to a positive control end of the transfer gate 234a to which a circle is not attached, and meanwhile, is supplied to a negative control end of the transfer gate 234a to which a circle is attached by being subjected to a logical inversion using the inverter 232a. Similarly, the selection signal Sb is supplied to a positive control end of the transfer gate 234b, and meanwhile, is supplied to a negative control end of the transfer gate 234b by being subjected to a logical inversion using the inverter 232b.

The driving signal COM-A is supplied to an input end of the transfer gate 234a, and the driving signal COM-B is supplied to an input end of the transfer gate 234b. Output ends of the transfer gates 234a and 234b are commonly connected, and are connected to one end of a corresponding piezoelectric element 60.

The transfer gate 234a causes the input end and the output end to be electrically connected (ON) therebetween, when the selection signal Sa is an H level, and causes the input end and the output end not to be electrically connected (OFF) therebetween, when the selection signal Sa is an L level. Similarly, the transfer gate 234b also sets the input end and the output end to ON/OFF therebetween, according to the selection signal Sb.

Subsequently, operations of the selection control section 210 and the selecting unit 230 will be described with reference to FIG. 5.

The data signal Data is supplied in series to each nozzle from the control section 100, in synchronization with the clock signal Sck, and is sequentially transmitted in the shift registers 212 corresponding to the nozzle. In addition, when the control section 100 stops supplying of the clock signal Sck, it enters a state in which the data signal Data corresponding to the nozzle is held in the respective shift registers 212. The data signal Data is supplied in sequential order corresponding to the last stage m, . . . , the second stage, the first stage in the shift register 212.

Here, when the control signal LAT rises, the respective latch circuits 214 simultaneously latch the data signals Data stored in the shift register 212. In FIG. 5, L1, L2, . . . , Lm denote data signals Data which are obtained by latching the data signal Data using the latch circuit 214 corresponding to the shift registers 212 of the first stage, the second stage, . . . , the mth stage.

The decoder 216 outputs the selection signal Sa, and a logic levels of and Sa using contents which are illustrated in FIG. 7, in respective periods T1 and T2, according to a size of a dot which is regulated by the latched data signal Data.

That is, first, in a case in which the data signal Data is (1, 1), and a size of a large dot is regulated, the decoder 216 sets the selection signals Sa and Sb to an H level and an L level in the period T1, and to the H level and the L level also in the period T2. Secondly, in a case in which the data signal Data is (0, 1), and a size of a medium dot is regulated, the decoder 216 sets the selection signals Sa and Sb to the H level and the L level in the period T1, and to the L level and the H level in the period T2. Thirdly, in a case in which the data signal Data is (1, 0), and a size of a small dot is regulated, the decoder 216 sets the selection signals Sa and Sb to the L level and the L level in the period T1, and to the L level and the H level in the period T2. Fourthly, in a case in which the data signal Data is (0, 0), and non-recording is regulated, the decoder 216 sets the selection signals Sa and Sb to the L level and the H level in the period T1, and to the L level and the L level in the period T2.

Figure 9:
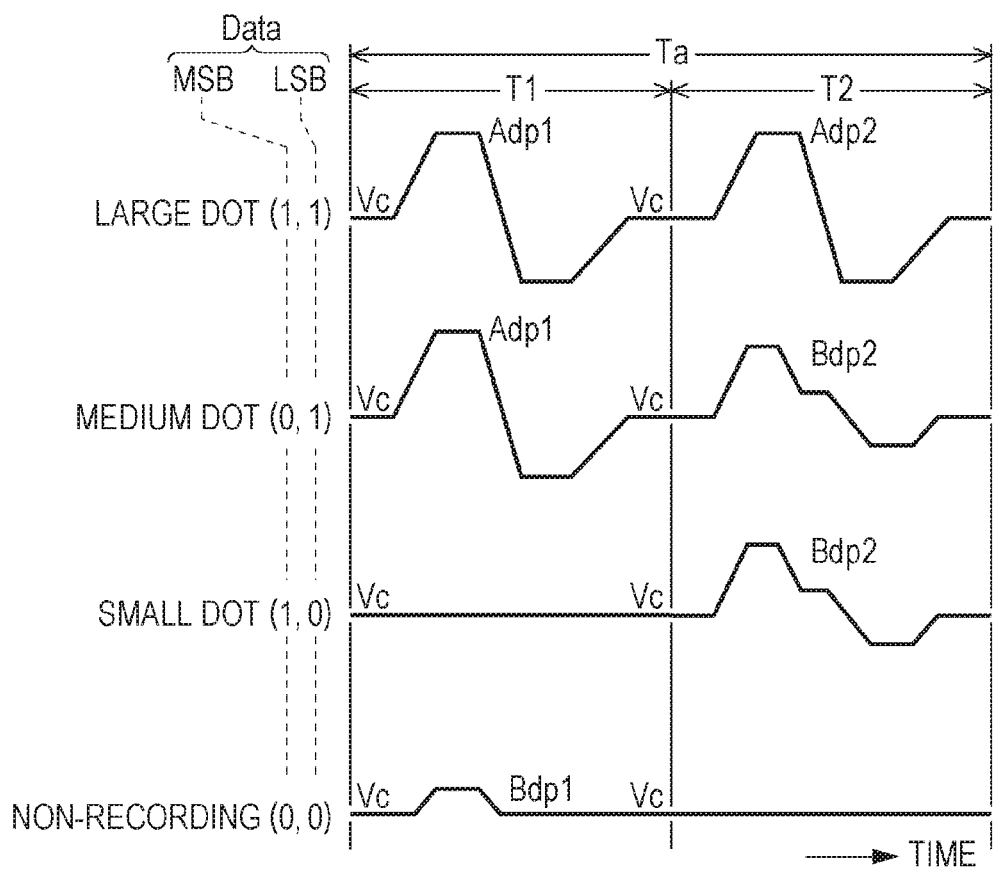
FIG. 9 is a diagram which illustrates a driving signal which is selected by the selecting unit.

FIG. 9 is a diagram which illustrates a voltage waveform of a driving signal which is selected according to the data signal Data, and is supplied to one end of the piezoelectric element 60.

Since the selection signals Sa and Sb become the H level and the L level in the period T1 when the data signal Data is (1, 1), the transfer gate 234a is turned on, and the transfer gate 234b is turned off. For this reason, the trapezoidal waveform Adp1 of the driving signal COM-A is selected in the period T1. Since the selection signals Sa and Sb become the H level and the L level also in the period T2, the selecting unit 230 selects the trapezoidal waveform Adp2 of the driving signal COM-A.

In this manner, when the trapezoidal waveform Adp1 is selected in the period T1, the trapezoidal waveform Adp2 is selected in the period T2, and the trapezoidal waveforms are supplied to one end of the piezoelectric element 60 as driving signals, ink of a moderate amount is ejected from a nozzle 651 corresponding to the piezoelectric element 60 in twice. For this reason, respective ink land on the medium P, are united, and as a result, a large dot as regulated by the data signal Data is formed.

Since the selection signals Sa and Sb become the H level and the L level in the period T1 when the data signal Data is (0, 1), the transfer gate 234a is turned on, and the transfer gate 234b is turned off. For this reason, the trapezoidal waveform Adp1 of the driving signal COM-A is selected in the period T1. Subsequently, since the selection signals Sa and Sb become the L level and the H level in the period T2, the trapezoidal waveform Bdp2 of the driving signal COM-B is selected.

Accordingly, ink of a moderate amount and a small amount are ejected in twice from a nozzle. For this reason, respective ink land on the medium P, are united, and as a result, a medium dot is formed, as regulated by the data signal Data.

Since both the selection signals Sa and Sb become the L level in the period T1 when the data signal Data is (1, 0), the transfer gates 234a and 234b are turned off. For this reason, neither the trapezoidal waveform Adp1 nor Bdp1 is selected in the period T1. In a case in which both the transfer gates 234a and 234b are turned off, a path from a connecting point of output ends of the transfer gates 234a and 234b to one end of the piezoelectric element 60 enters a high impedance state of not being electrically connected to any portion. However, the piezoelectric element 60 holds a voltage (Vc-$V_{BS}$) which is obtained immediately before the transfer gate is turned off, due to its own capacity.

Subsequently, since the selection signals Sa and Sb become the L level and the H level in the period T2, the trapezoidal waveform Bdp2 of the driving signal COM-B is selected. For this reason, since ink of a small amount is ejected only in the period T2 from the nozzle 651, a small dot is formed on the medium P as regulated by the data signal Data.

Since the selection signals Sa and Sb become the L level and the H level in the period T1 when the data signal Data is (0, 0), the transfer gate 234a is turned off, and the transfer gate 234b is turned on. For this reason, the trapezoidal waveform Bdp1 of the driving signal COM-B is selected in the period T1. Subsequently, since both the selection signals Sa and Sb become the L level in the period T2, neither the trapezoidal waveform Adp2 nor Bdp2 B is selected.

For this reason, since ink in the vicinity of the opening hole portion of the nozzle 651 minutely vibrates, and is not ejected in the period T1, as a result, a dot is not formed. That is, it becomes non-recording as regulated by the data signal Data.

In this manner, the selecting unit 230 selects (or does not select) the driving signal COM-A or COM-B according to an instruction of the selection control section 210, and supplies the driving signal to one end of the piezoelectric element 60. For this reason, each piezoelectric element 60 is driven according to a size of a dot which is regulated by the data signal Data.

The driving signals COM-A and COM-B which are illustrated in FIG. 5 are merely examples. In practice, a combination of various waveforms which are prepared in advance is used according to a movement speed of the head unit 20, a property of the medium P, or the like.

Here, an example in which the piezoelectric element 60 bends upward along with an increase in voltage has been described; however, when a voltage supplied to the electrodes 611 and 612 is reversed, the piezoelectric element 60 bends downward along with an increase in voltage. For this reason, in a configuration in which the piezoelectric element 60 bends downward along with an increase in voltage, the driving signals COM-A and COM-B illustrated in the figure have waveforms which are reversed based on the voltage Vc.

In this manner, according to the embodiment, one dot is formed on the medium P in a unit of the cycle Ta which is a unit period. For this reason, in the embodiment in which one dot is formed, using ejecting of ink droplets of two times (at maximum) in the cycle Ta, the ink ejecting frequency f becomes 2/Ta, and the dot interval D becomes a value obtained by dividing the movement speed v of the head unit by the ink ejecting frequency f (=2/Ta).

In general, in a case in which it is possible to eject ink droplets Q (Q is integer of 2 or more) times in a unit period T, and one dot is formed, using ejecting of ink droplets of the Q times, it is possible to denote the ink ejecting frequency f by Q/T.

As in the embodiment, it is necessary to set a time for ejecting ink droplets once to be short, even when a time for forming one dot (cycle) is the same, in a case of forming dots of different sizes on the medium P, and a case of forming one dot using ejecting of ink droplets of one time.

Special descriptions for the third method in which two or more dots are formed without combining two or more ink droplets may not be necessary.

Subsequently, the driving circuit 50 will be described. When schematically describing the two driving circuits 50, the driving circuits output the driving signal COM-A (COM-B) as described below. That is, between the two driving circuits 50, one driving circuit firstly performs analog conversion with respect to the data dA which is supplied from the control section 100, secondly, feeds back the driving signal COM-A which is output, corrects a deviation between a signal based on the driving signal COM-A (attenuation signal) and a target signal using a high frequency component of the driving signal COM-A, and generates a modulated signal according to the corrected signal, thirdly, generates an amplified-modulated signal by switching a transistor according to the modulated signal, and fourthly, planarizes the amplified-modulated signal by using a low pass filter, and outputs the planarized signal as the driving signal COM-A.

The other of the two driving circuits 50 has the same configuration, and is different only in a point that the driving signal COM-B is output from the data dB. Therefore, for convenience, the driving circuit 50 which outputs the driving signal COM-A will be described as an example.

Figure 10:
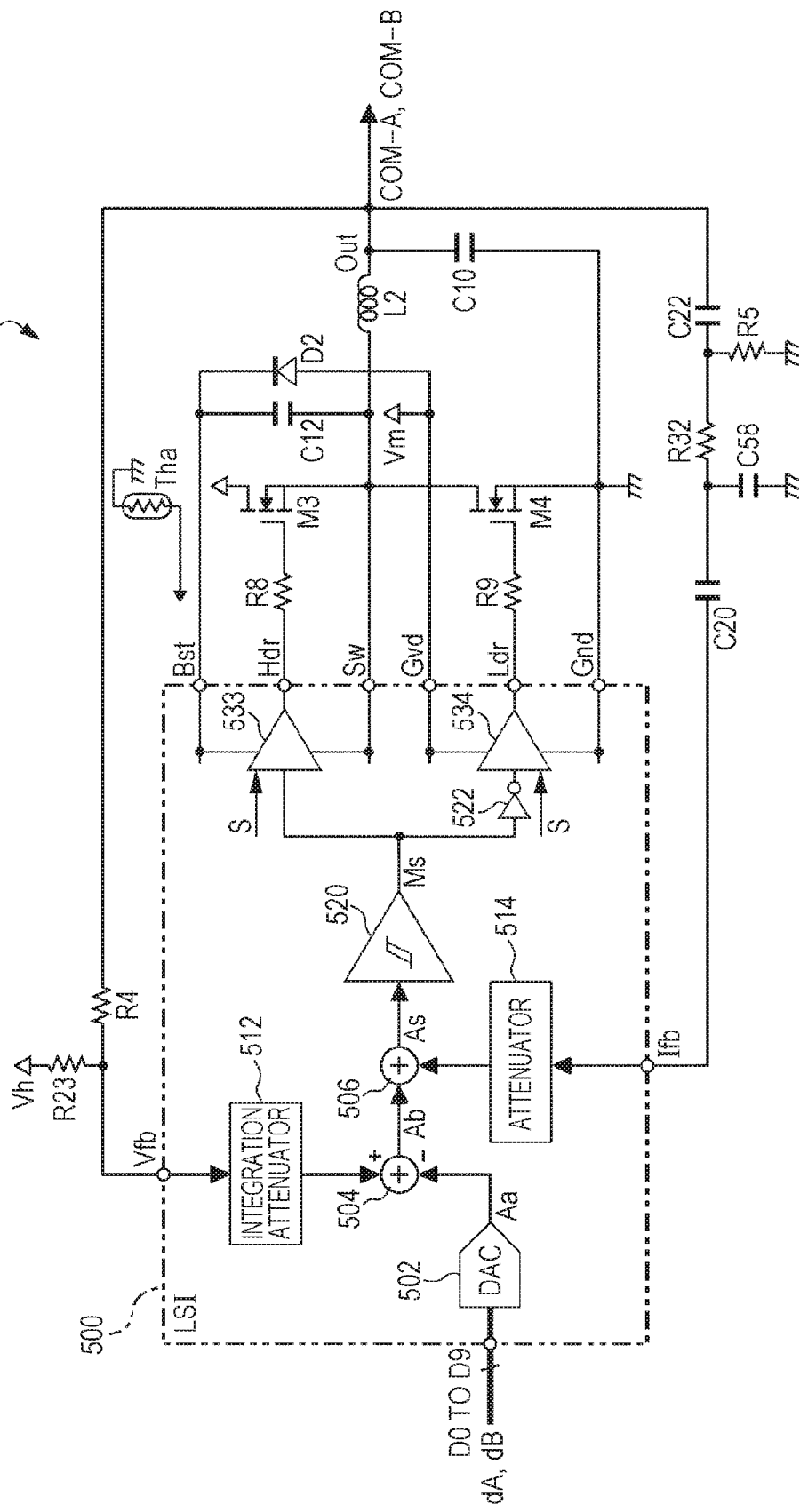
FIG. 10 is a diagram which illustrates a configuration of a driving circuit in the printing apparatus.

FIG. 10 is a diagram which illustrates a circuit configuration of the driving circuit 50.

As illustrated in the figure, the driving circuit 50 is configured of various elements such as a resistor, or a capacitor, in addition to an LSI 500, or transistors M3 and M4.

FIG. 10 illustrates a configuration of the driving circuit 50 for outputting the driving signal COM-A; however, in practice, a circuit for generating both of the driving signals COM-A and COM-B of two systems is set to one package with respect to the LSI 500.

The large scale integration (LSI) 500 outputs a gate signal to respective transistor M3 and M4 based on the data dA of 10 bits which is input from the control section 100 through pins D0 to D9. For this reason, the LSI 500 includes a digital-to-analog converter (DAC) 502, adders 504 and 506, an integration attenuator 512, an attenuator 514, a comparator 520, a NOT circuit 522, and gate drivers 533 and 534.

The DAC 502 converts the data dA which regulates a waveform of the driving signal COM-A into an analog signal Aa, and supplies the signal to an input end (−) of the adder 504. A voltage amplitude of the analog signal Aa is approximately 0 V to 2 V, for example, and when amplifying the voltage approximately 20 times, it becomes the driving signal COM-A. That is, the analog signal Aa is a signal as a target before amplifying the driving signal COM-A.

The integration attenuator 512 attenuates a voltage of a terminal Out which is input through a pin Vfb, that is, the driving signal COM-A, integrates thereof, and supplies to an input end (+) of the adder 504.

The adder 504 supplies a signal Ab with a voltage which is obtained by subtracting a voltage in the input end (−) from a voltage in the input end (+), and integrating thereof to one side of an input end of the adder 506.

A power supply voltage of a circuit from the DAC 502 to the NOT circuit 522 is 3.3 V with low amplitude (voltage Vdd). For this reason, since there is a case in which a voltage of the driving signal COM-A is maximum, and exceeds 40 V, in contrast to a voltage of the analog signal Aa which is approximately 2 V at most, a voltage of the driving signal COM-A is attenuated by the integration attenuator 512 in order to cause amplitude ranges of both of the voltages to match, when obtaining a deviation.

The attenuator 514 attenuates a high frequency component of the driving signal COM-A which is input through a pin Ifb, and supplies thereof to the other side of the input end of the adder 506. The adder 506 supplies a signal As of a voltage which is obtained by adding a voltage on one side and a voltage on the other side of the input end to the comparator 520. Attenuating of the attenuator 514 is performed in order to cause amplitude to match, when feeding back the driving signal COM-A, similarly to the integration attenuator 512.

A voltage of the signal As which is output from the adder 506 is a voltage obtained by subtracting a voltage of the analog signal Aa from an attenuated voltage of a signal supplied to a pin Vfb, and adding an attenuated voltage of a signal supplied to the pin Ifb. For this reason, a voltage of the signal Ab using the adder 506 is a signal obtained by correcting a deviation obtained by subtracting a voltage of the analog signal Aa as a target from the attenuated voltage of the driving signal COM-A which is output from the terminal Out using the high frequency component of the driving signal COM-A.

The comparator 520 outputs a modulated signal Ms which is pulse-modulated as follows, based on a voltage added using the adder 506. In detail, the comparator 520 outputs a modulated signal Ms in which the signal As which is output from the adder 506 becomes an H level when being a voltage threshold value of Vth1 or more, in a case of a rising voltage, and becomes an L level when being less than the voltage threshold value of Vth2, in a case of a falling voltage. In addition, as described below, the voltage threshold value is set so as to satisfy a relationship of Vth1>Vth2.

The modulated signal Ms using the comparator 520 is supplied to the gate driver 534 through a logical inversion using the NOT circuit 522. Meanwhile, the modulated signal Ms is supplied to the gate driver 533 without being subjected to a logical inversion. For this reason, logic levels which are supplied to the gate drivers 533 and 534 are in an exclusive relationship with each other.

In practice, timings of the logic levels which are supplied to the gate drivers 533 and 534 may be controlled so as not to be the H level at the same time (so that transistors M3 and M4 are not turned on at the same time). For this reason, the exclusive relationship, referred to here, means that there is no case in which the logic levels become the H level at the same time (in case of transistors M3 and M4, transistors are not turned on at the same time), strictly speaking.

Incidentally, the modulated signal referred to here is the modulated signal Ms in a narrow sense; however, when considered as a signal which is subjected to pulse modulation according to the signal Aa, the modulated signal is included in a negative signal (NOT circuit 522 is also included in modulated signal) of the modulated signal Ms. That is, a signal obtained by reversing a logic level of the modulated signal Ms, or a signal which is subjected to a timing control is also included in the modulated signal which is pulse-modulated according to the signal Aa, not only the modulated signal Ms.

Since the comparator 520 outputs the modulated signal Ms, a circuit to the comparator 520, that is, the DAC 502, the adders 504 and 506, the integration attenuator 512, the attenuator 514, and the comparator 520 can be a modulation circuit which generates the modulated signal Ms.

In the configuration illustrated in FIG. 10, the digital data dA is converted into the analog signal Aa using the DAC 502; however, the signal Aa may be supplied from an external circuit according to an instruction of the control section 100, for example, not through the DAC 502. Since a target value when generating a waveform of the driving signal COM-A is regulated in both of the digital data dA and the analog signal Aa, both are surely source signals.

When a stop is not instructed, using the control signal S, both of the gate drivers 533 and 534 perform a level shift with respect to the low-amplitude logic (L level: 0 V, H level: 3.3 V) which is input, and outputs thereof as high-amplitude logic (for example, L level: 0 V, H level: 7.5 V). When a stop is instructed, using the control signal S, both of the gate drivers 533 and 534 forcibly set an output to the L level, regardless of a logic level of an input signal.

When describing a case in which a stop is not instructed using a control signal S in detail, the gate driver 533 inputs low-amplitude logic as an output signal of the comparator 520, and outputs thereof from a pin Hdr by performing a level shift to high-amplitude logic, and the gate driver 534 inputs low-amplitude logic as an output signal of the NOT circuit 522, and outputs thereof from a pin Ldr by performing a level shift to high-amplitude logic.

In the power supply voltages of the gate driver 533, a voltage on the high side is a voltage applied through a pin Bst, and a voltage on the low side is a voltage applied through a pin Sw. The pin Sw is connected to a source electrode in the transistor M3, a drain electrode in the transistor M4, the other end of the capacitor C12, and one end of the inductor L2.

In the power supply voltages of the gate driver 534, the voltage Vm (for example, 12 V) is applied through the pin Gvd on the high side, and a voltage zero is applied through the pin Gnd on the low side, that is, the pin Gnd is grounded. The pin Gvd is connected to a cathode electrode of a diode D2 for preventing backflow, and an anode electrode of the diode D2 is connected to one end of the capacitor C12, and a pin Bst.

The transistors M3 and M4 are, for example, N-channel field effect transistors (FET). In these, in the transistor M3 on the high side, a voltage Vh (for example, 42 V) is applied to a drain electrode, and a gate electrode is connected to a pin Hdr through a resistor R8. In the transistor M4 on the low side, a gate electrode is connected to a pin Ldr through a resistor R9, and a source electrode is grounded.

The other end of the inductor L2 is the terminal Out as an output of the driving circuit 50, and the driving signal COM-A is supplied to the head unit 20 from the terminal Out through the flexible cable 190 (refer to FIGS. 1 and 2).

The terminal Out is connected to one end of a capacitor C10, one end of a capacitor C22, and one end of a resistor R4, respectively. Among these, the other end of the capacitor C10 is grounded. For this reason, the inductor L2 and the capacitor C10 function as a low pass filter (LPF) which planarizes an amplified-modulated signal which appears at a connecting point of the transistors M3 and M4.

The other end of the resistor R4 is connected to the pin Vfb, and one end of the resistor R23, and the voltage Vh is applied to the other end of the resistor R23. In this manner, the driving signal COM-A from the terminal Out is pulled up, and is fed back to the pin Vfb.

Meanwhile, the other end of the capacitor C22 is connected to one end of the resistor R5, and one end of the resistor R32. In these, the other end of the resistor R5 is grounded. For this reason, the capacitor C22 and the resistor R5 function as a high pass filter (HPF) which causes a high frequency component of a cutoff frequency or more in the driving signal COM-A from the terminal Out to pass through. The cutoff frequency of HPF is set to approximately 9 MHz, for example.

The other end of the resistor R32 is connected to one end of the capacitor C20 and one end of a capacitor C58. In these, the other end of the capacitor C58 is grounded. For this reason, the resistor R32 and the capacitor C58 function as a low pass filter (LPF) which causes a low frequency component of a cutoff frequency or less in signal components which pass through the HPF to pass through. The cutoff frequency of LPF is set to approximately 160 MHz, for example.

Since the above described cutoff frequency of HPF is set to be lower than the above described cutoff frequency of LPF, the HPF and LPF function as a band pass filter (BPF) which causes a high frequency component in a predetermined frequency range, in the driving signal COM-A to pass through.

The other end of the capacitor C20 is connected to the pin Ifb of the LSI 500. In this manner, a DC component in the high frequency component of the driving signal COM-A which passes through the BPF is cut, and is fed back to the pin Ifb.

Incidentally, the driving signal COM-A which is output from the terminal Out is a signal which is obtained by palanarizing an amplified-modulated signal in the connecting point (pin Sw) of the transistors M3 and M4 using a low pass filter which is formed of the inductor L2 and the capacitor C10. Since the driving signal COM-A is positively fed back to the adder 504 after being integrated and subtracted through the pin Vfb, the driving signal is subjected to self-excited oscillation using a frequency which is determined by a delay in feedback (sum of delay due to planarization of inductor L2 and capacitor C10, and delay using integration attenuator 512), and a transfer function of feedback.

However, since a delay amount of a feedback path through the pin Vfb is large, it is not possible to increase the frequency for self-excited oscillation so as to sufficiently secure an accuracy of the driving signal COM-A, only by the feedback through the pin Vfb.

Therefore, according to the embodiment, a delay in the entire circuit is set to be small, by providing a path to which a high frequency component of the driving signal COM-A is fed back through the pin Ifb, separately from a path through the pin Vfb. For this reason, it is possible to increase a frequency of the signal As which is obtained by adding the high frequency component of the driving signal COM-A to the signal Ab, so that it is possible to sufficiently secure an accuracy of the driving signal COM-A, compared to a case in which there is no path through the pin Ifb.

The thermistor Tha is provided in the vicinity of the transistor M3, though the thermistor is not directly involved in a generation of the driving signal COM-A. One end of the thermistor Tha is connected to the control section 100 (omitted in FIG. 10), and the other end of the thermistor Tha is grounded. Here, the control section 100 has a configuration of detecting a peripheral temperature of the transistor M3 from a resistance value of the thermistor Tha.

Figure 11:
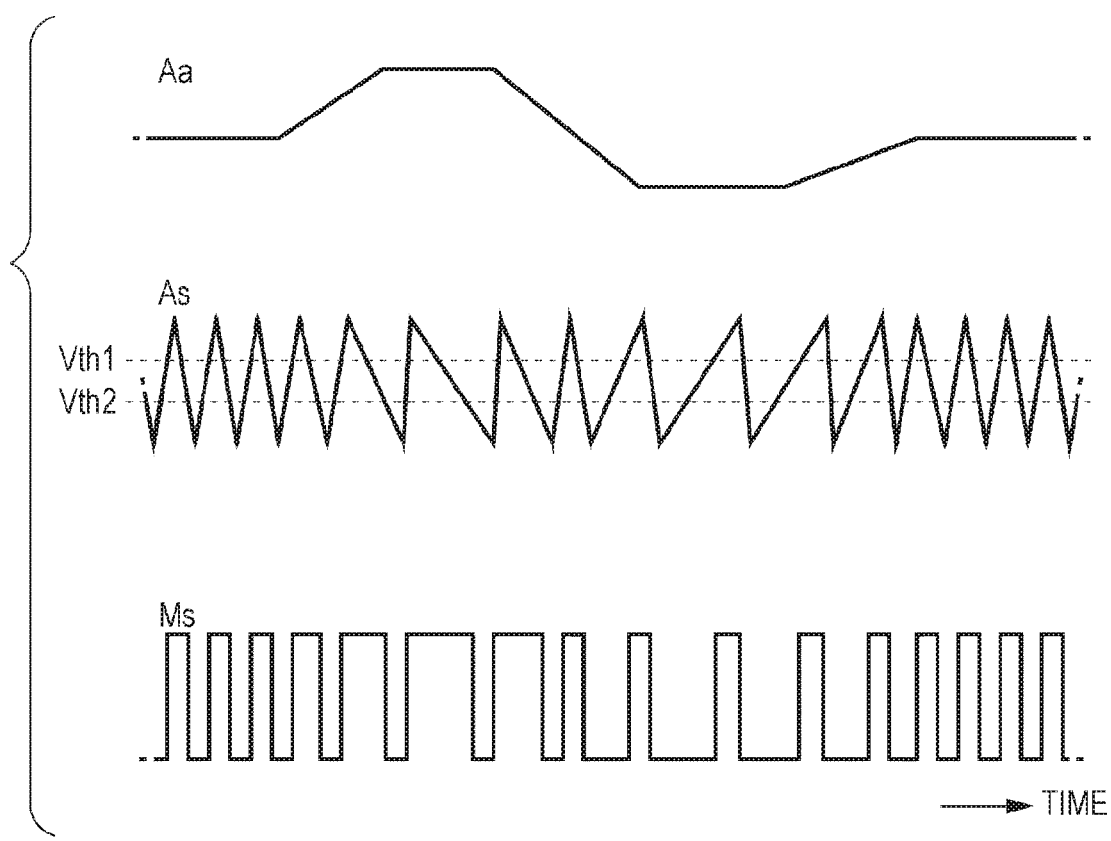
FIG. 11 is a diagram which describes operations of the driving circuit.

FIG. 11 is a diagram in which waveforms of the signal As and the modulated signal Ms are illustrated by being associated with a waveform of the analog signal Aa.

As illustrated in the figure, the signal As is a triangular wave, and an oscillating frequency thereof is changed according to a voltage (input voltage) of the analog signal Aa. Specifically, the oscillating frequency becomes the highest value in a case in which the input voltage is a medium value, and becomes low when the input value becomes higher, or lower than the medium value.

An inclination of the triangular wave in the signal As is appropriately the same in rising (rising of voltage) and falling (falling of voltage), when the input voltage is close to the medium value. For this reason, a duty ratio of the modulated signal Ms which is a result obtained by comparing the signal As with the voltage threshold values Vth1 and Vth2, using the comparator 520 becomes approximately 50%. When the input voltage becomes higher than the medium value, a falling inclination of the signal As become moderate. For this reason, a period in which the modulated signal Ms becomes the H level is relatively long, and a duty ratio increases. On the other hand, a rising inclination of the signal As becomes moderate when the input voltage becomes lower than the medium value. For this reason, a period in which the modulated signal Ms becomes the L level is relatively short, and a duty ratio decreases.

For this reason, the modulated signal Ms becomes the following pulse density modulation signal. That is, the duty ratio of the modulated signal Ms is approximately 50% when the input voltage is the medium value, increases when the input voltage becomes higher than the medium value, and decrease when the input voltage becomes lower than the medium value.

The gate driver 533 turns on/off the transistor M3 based on the modulated signal Ms. That is, the gate driver 533 turns on the transistor M3 when the modulated signal Ms is an H level, and turns off thereof when the modulated signal Ms is an L level. The gate driver 534 turns on/off the transistor M4 based on a logical inversion signal of the modulated signal Ms. That is, the gate driver 534 turns off the transistor M4 when the modulated signal Ms is the H level, and turns on thereof when the modulated signal Ms is the L level.

Accordingly, since a voltage of the driving signal COM-A which is obtained by planarizing an amplified-modulated signal in the connecting point of the transistors M3 and M4 using the inductor L2 and the capacitor C10 increases when the duty ratio of the modulated signal Ms increases, and decreases when the duty ratio of the modulated signal Ms decreases, as a result, the driving signal COM-A is controlled so as to be a signal which increases a voltage of the analog signal Aa, and is output.

Since the driving circuit 50 uses a pulse density modulation, there is an advantage that it is possible to obtain a large variation width of the duty ratio, compared to a pulse width modulation in which a modulation frequency is fixed.

That is, since a minimum positive pulse width and negative pulse width which can be treated in the entire circuit are restricted due to circuit characteristics thereof, in a pulse width modulation with a fixed frequency, it is possible to secure only a predetermined range (range, for example, from 10% to 90%) as a variation width of the duty ratio. In contrast to this, in the pulse density modulation, since the oscillating frequency decreases when the input voltage is far from the medium value, in a region in which the input voltage is high, it is possible to further increase the duty ratio, and in a region in which the input voltage is low, it is possible to further decrease the duty ratio. For this reason, in the self-excited oscillation-type pulse density modulation, it is possible to secure a wide range (for example, from 5% to 95%) as the variation width of the duty ratio.

The driving circuit 50 is the self-excited oscillation type, and a circuit which generates a carrier wave of a high frequency like separately-excited oscillation is not necessary. For this reason, there is an advantage that it is easy to integrate portions other than a circuit which treats a high voltage, that is, a portion of the LSI 500.

Moreover, in the driving circuit 50, since there is a path for feeding back a high frequency component through the pin Ifb, as a feedback path of the driving signal COM-A, not only a path through the pin Vfb, it is possible to reduce a delay in the entire circuit. For this reason, since a frequency for self-excited oscillation increases, the driving circuit 50 can generate the driving signal COM-A with good accuracy.

Such a driving circuit 50 is configured by mounting various elements such as a capacitor, or a resistor on the multilayered printed circuit board. Therefore, subsequently, a state in which various elements are mounted on the printed circuit board, or routing of wiring on the printed circuit board, or the like, will be described.

The printed circuit board is set to a four-layered board. As will be described later, the printed circuit board has a structure in which wiring patterns from a first layer to a fourth layer are stacked by interposing insulating layers therebetween, and wiring patterns on different layers are electrically connected, appropriately, via a through hole. In the description, the layer denotes a layer configuring the wiring pattern which is formed on an interface of the insulating layer, not the insulating layer.

Figure 12:
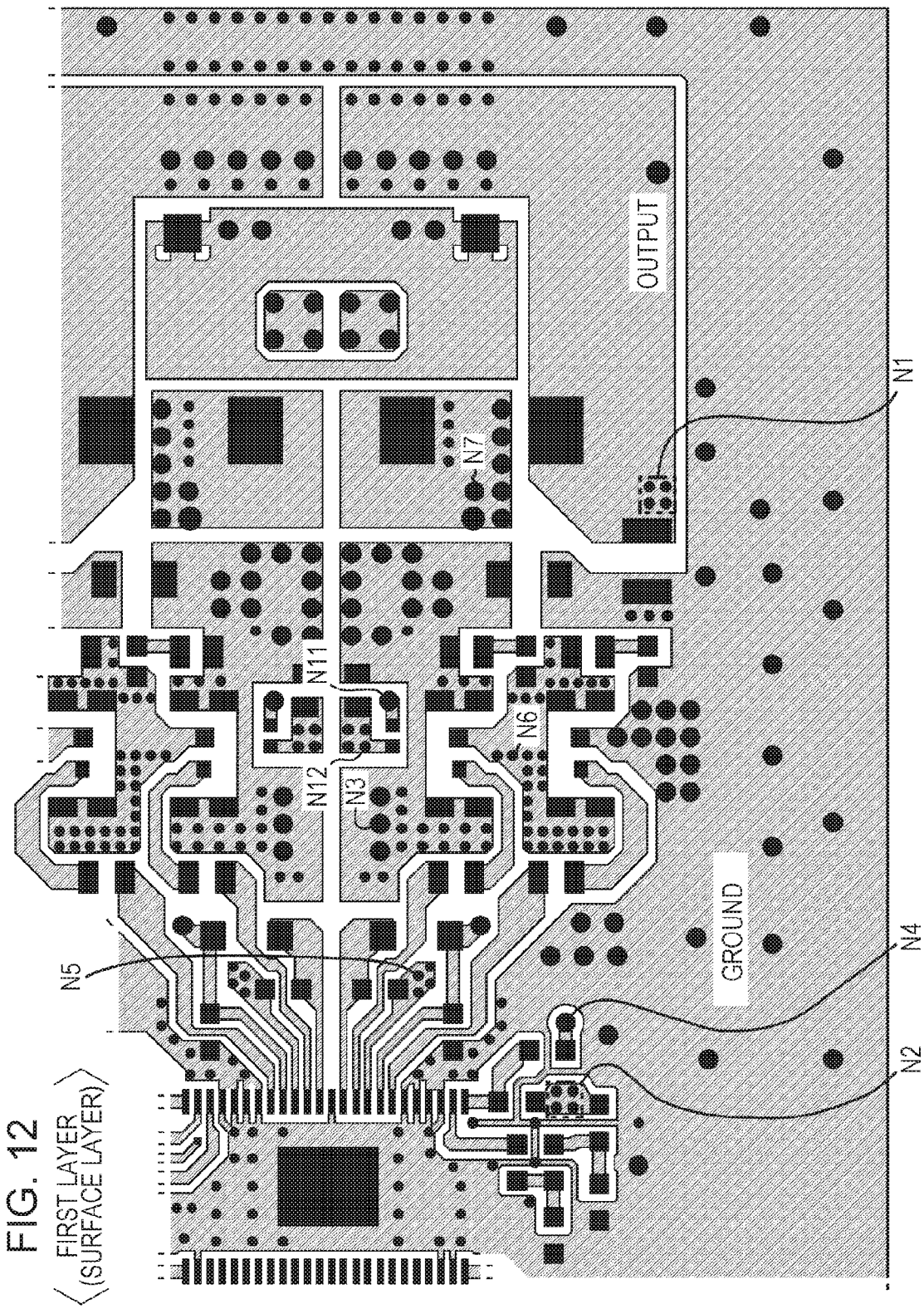
FIG. 12 is a diagram which illustrates a wiring pattern of a first layer in a printed circuit board.
Figure 13:
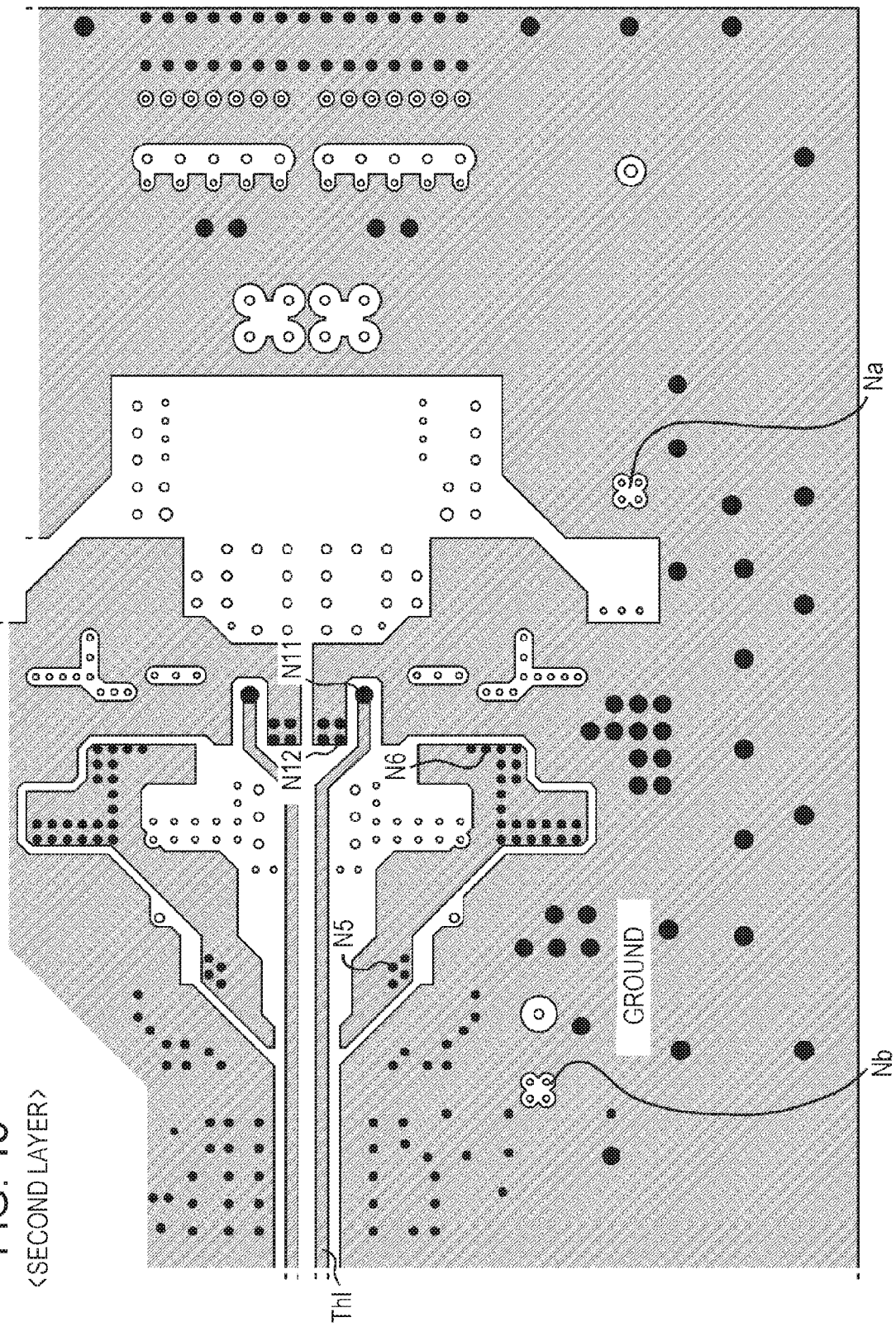
FIG. 13 is a diagram which illustrates a wiring pattern of a second layer in the printed circuit board.
Figure 14:
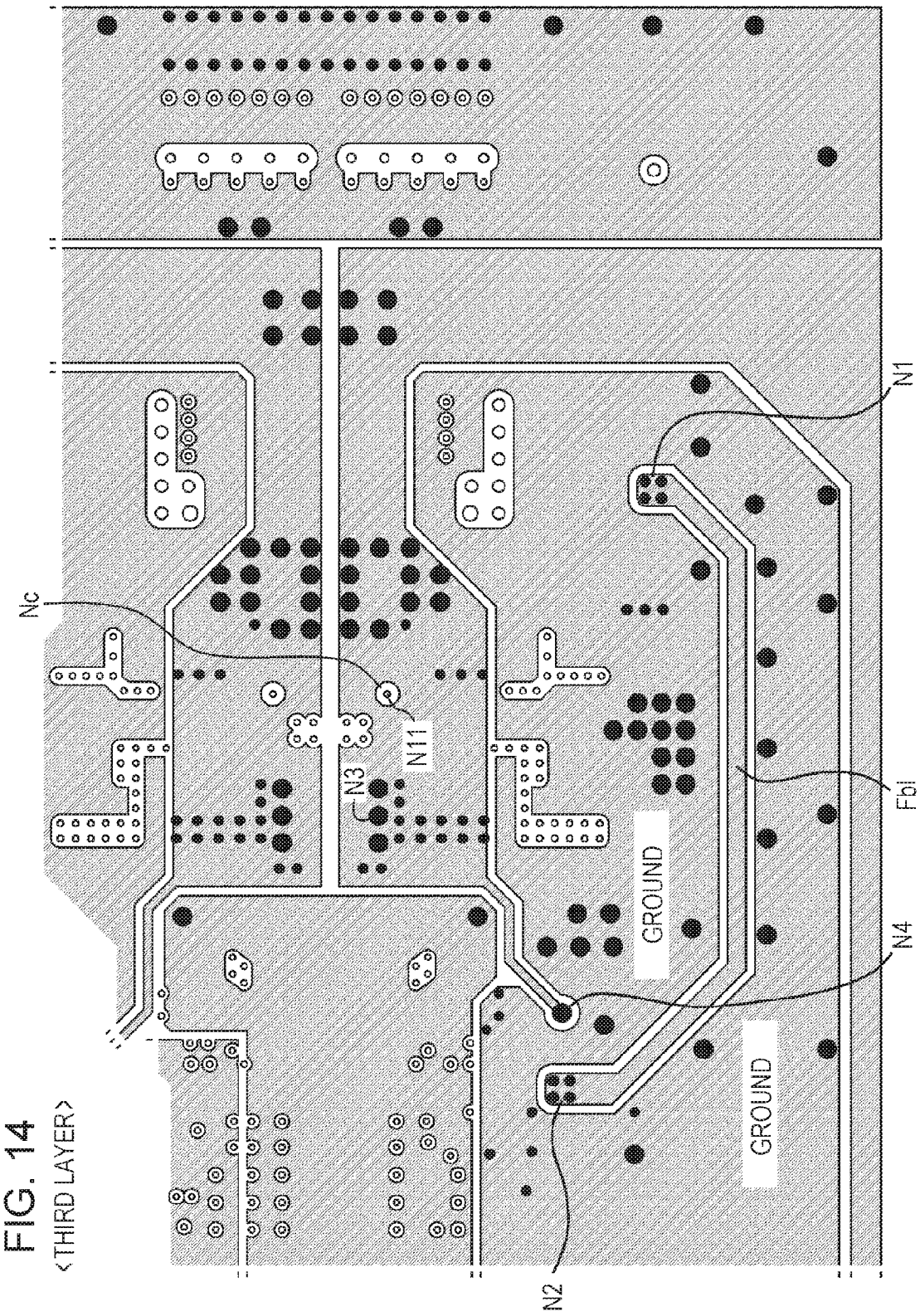
FIG. 14 is a diagram which illustrates a wiring pattern of a third layer in the printed circuit board.
Figure 15:
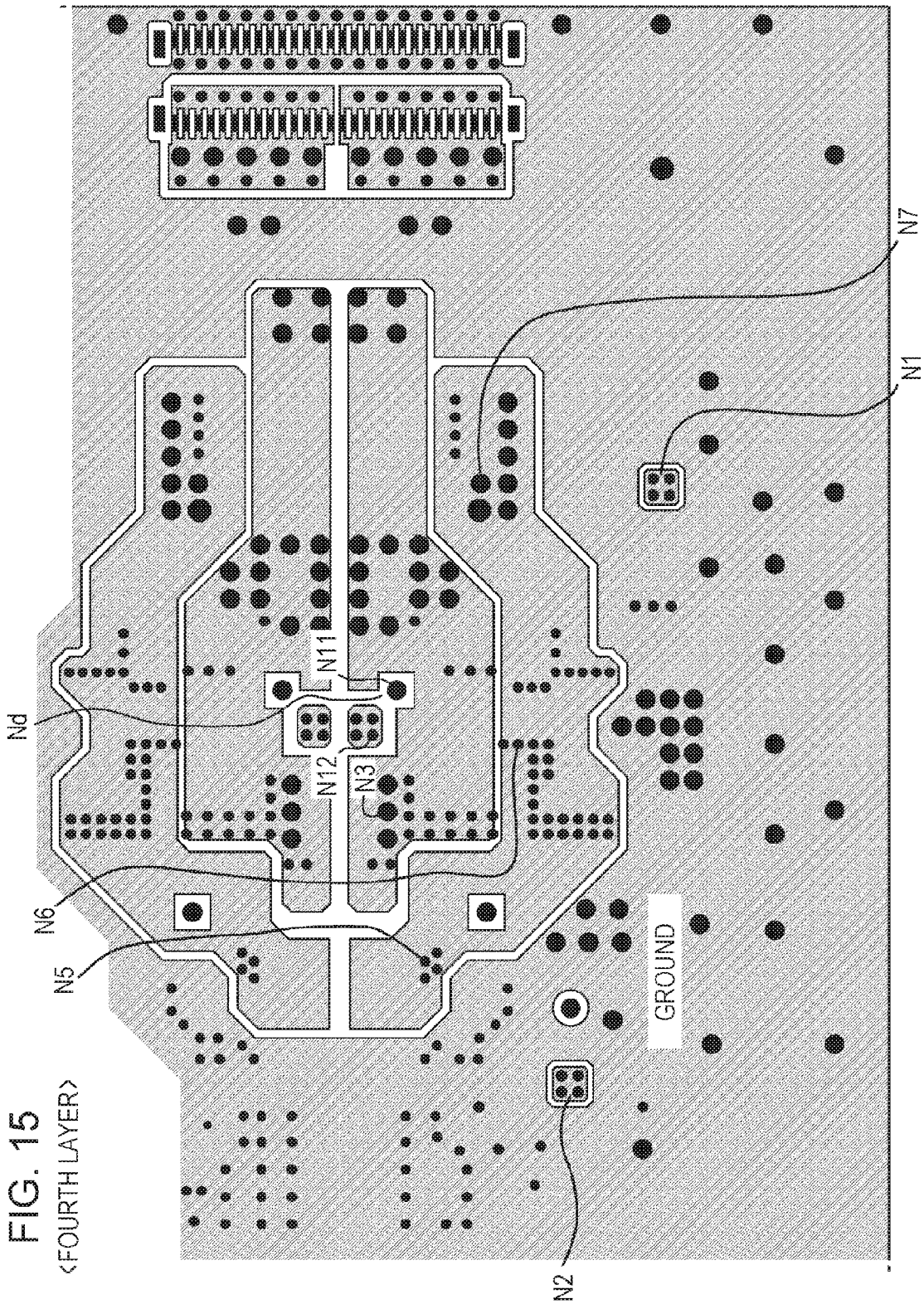
FIG. 15 is a diagram which illustrates a wiring pattern of a fourth layer in the printed circuit board.

FIG. 12 is a diagram which illustrates a wiring pattern on the first layer at the periphery of a configuration range of the driving circuit 50. Similarly, FIGS. 13 to 15 are diagrams which illustrate wiring patterns on the second layer, the third layer, and the fourth layer in printed circuit board.

In FIGS. 12 to 15, the first layer to fourth layer are names which are conveniently given to the four layers which configure the printed circuit board in order, from a mounting face. For this reason, the first layer and the fourth layer are the surface layers, and the second layer and the third layer are intermediate layers other than the surface layer. In addition, all of FIGS. 12 to 15 illustrate a state in which the printed circuit board is planarly viewed from the first layer as the mounting face toward the fourth layer.

In FIGS. 12 to 15, a region which is hatched with slanted lines is a wiring pattern which is obtained by patterning copper foil. Here, in a wiring pattern of a certain layer, a circular region which is colored in black is a through hole (via) for connecting a wiring pattern on the layer to a wiring pattern on another layer. In each layer, a region which is not hatched is a region in which a wiring pattern is not provided, and in these, a circular portion which is outlined denotes an opening hole portion of a through hole which is provided in order to connect wiring patterns on other layers, without connecting a wiring pattern on a certain layer.

In the wiring pattern on the first layer in FIG. 12, a rectangular region which is colored in black is a terminal (not terminal, is connecting portion in printed circuit board, and is also referred to as land) for connecting various elements. In addition, the wiring patterns on the first layer and the fourth layer as the surface layers are protected by solder resist (not illustrated) except for a through hole and a terminal. In other words, the terminal and the through hole can be exposed portions of the wiring pattern in the printed circuit board.

Figure 16:
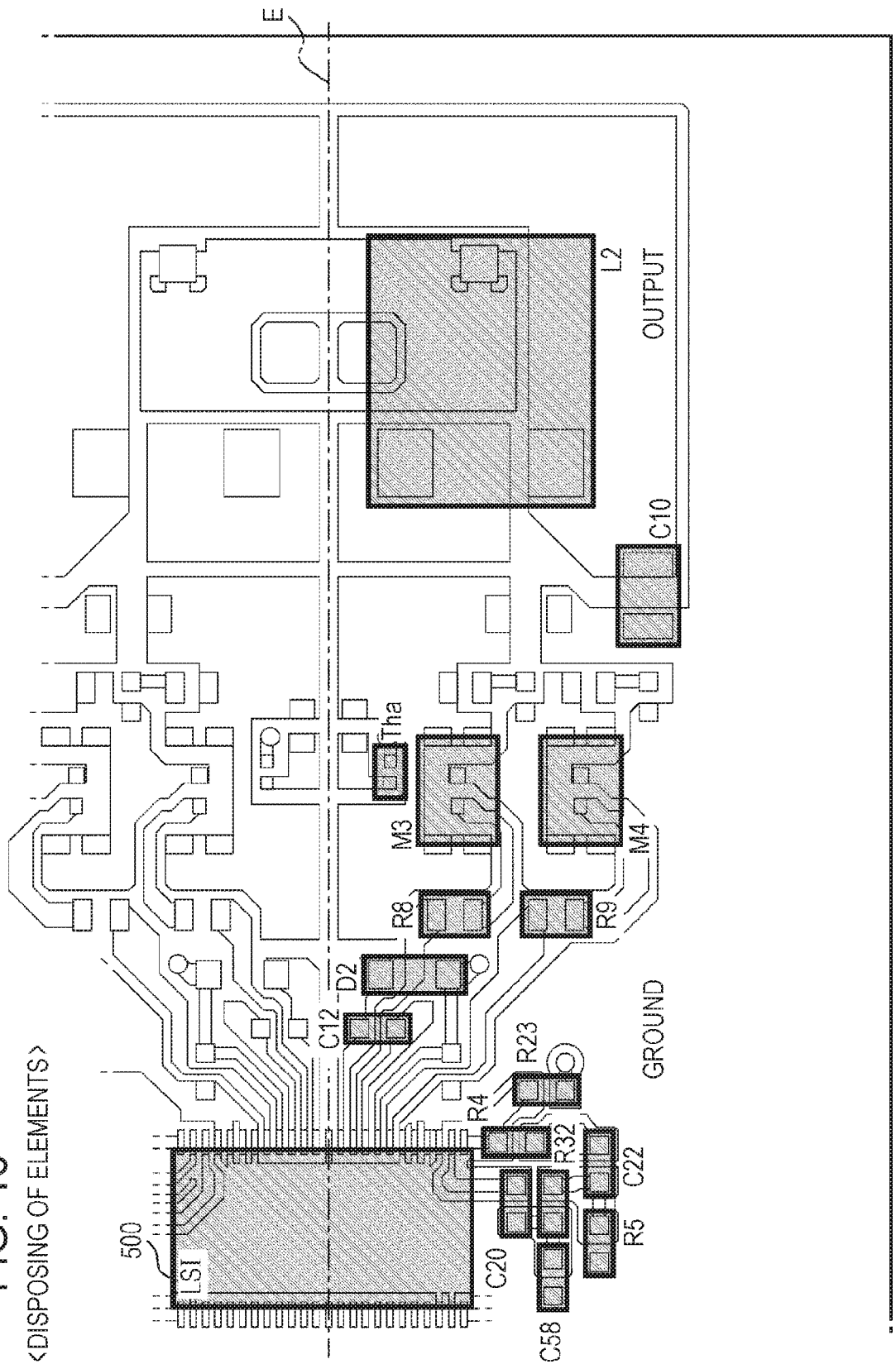
FIG. 16 is a diagram which illustrates a disposal of elements in the printed circuit board.
Figure 17:
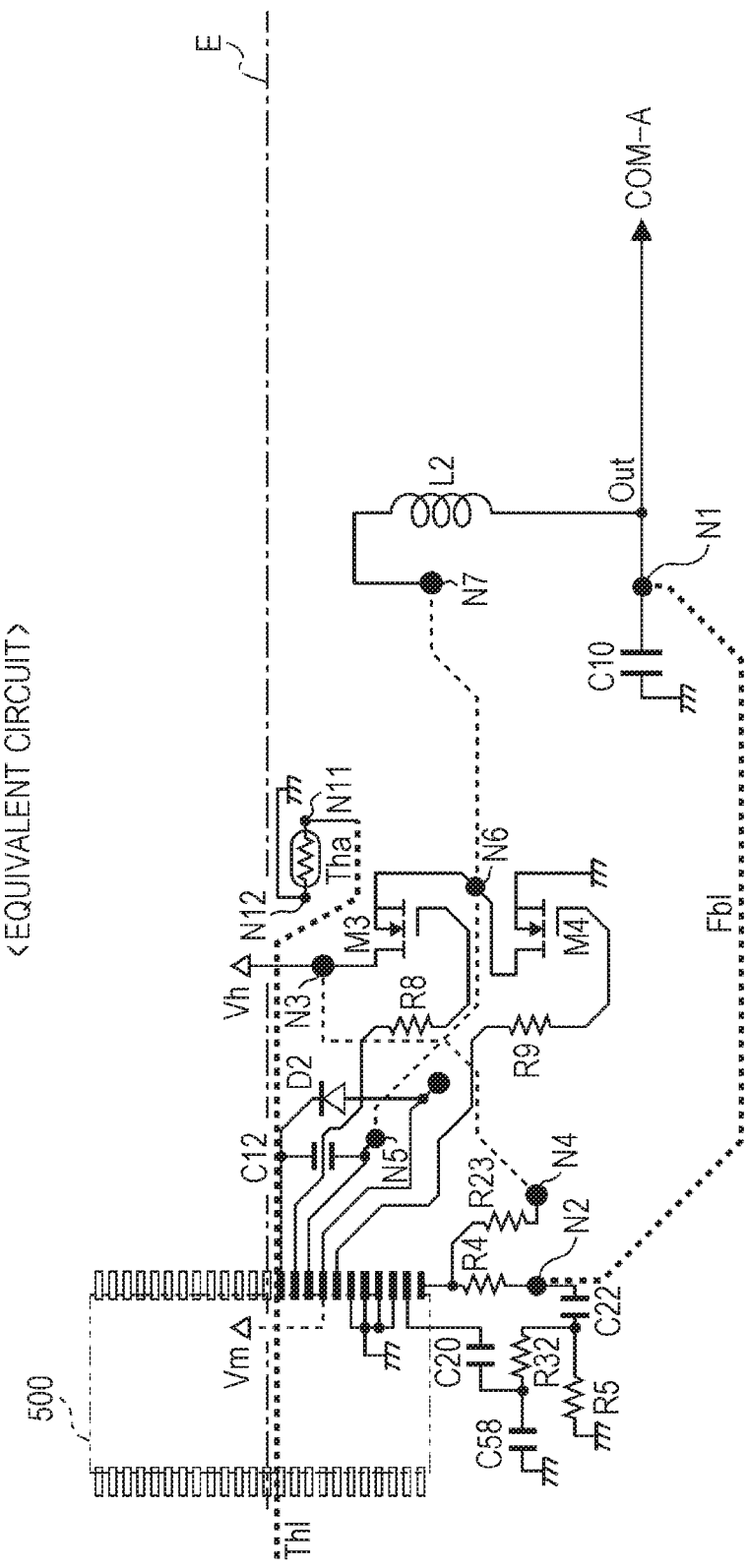
FIG. 17 is a diagram which illustrates an equivalent circuit of a driving circuit in the printed circuit board.
Figure 18:
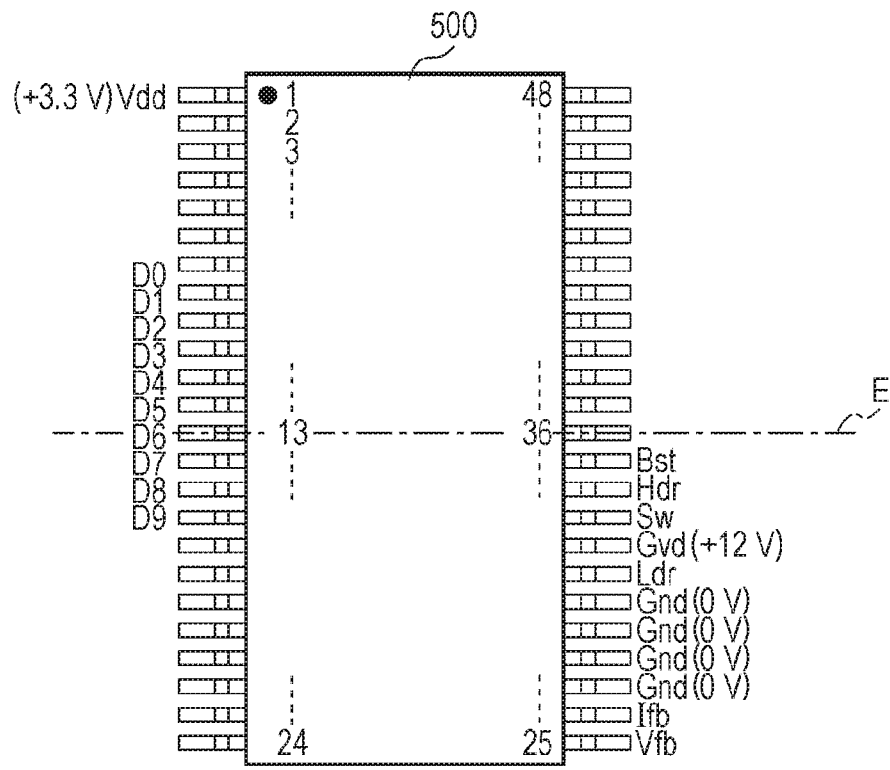
FIG. 18 is a diagram which illustrates pin assignment of an LSI in the driving circuit.

FIG. 16 is a plan view which illustrates disposing of elements which configure the driving circuit 50 in the printed circuit board, and FIG. 17 is a diagram which illustrates the equivalent circuit of the driving circuit 50 using a relationship with disposing of the elements which are mounted on the printed circuit board. FIG. 18 is a diagram which illustrates pin assignment of the LSI 500, that is, assignment of pins using dual in-line arrangement.

In FIGS. 12 to 17, a reduced scale is provided in order to illustrate a planar configuration of the printed circuit board; however, in FIG. 18, for convenient description, the reduced scale in FIGS. 12 to 17 is enlarged. In pin numbers of the LSI 500, a pin with a black circle which is marked on the upper right side in FIG. 18 is "1", and "2", "3", "4", ..., "48" are attached as pin numbers in counterclockwise, based on the pin No. 1.

In wiring of the equivalent circuit illustrated in FIG. 17, a solid line simply denotes a wiring pattern on the first layer (refer to FIG. 12), and dashed lines simply denote wiring patterns from the second layer to the fourth layer.

The terminal Out as a connecting portion of the other end of the inductor L2 and one end of the capacitor C10 is connected to one end of the feedback wiring pattern Fbl (refer to FIG. 14) via the through hole N1.

Figure 19:
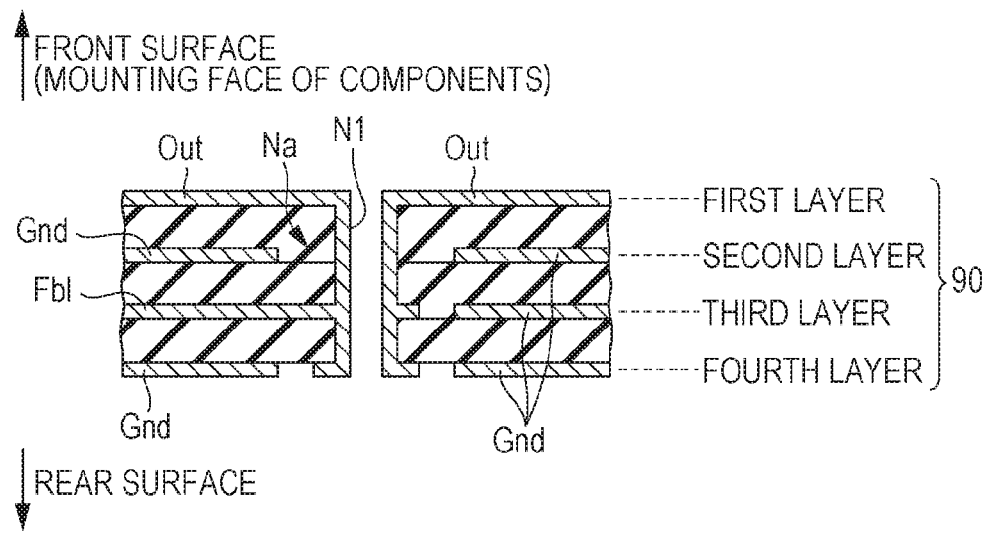
FIG. 19 is a sectional view which illustrates a structure of a through hole in the printed circuit board.

FIG. 19 is a partial sectional view which illustrates a structure of the printed circuit board at the periphery of the through hole N1.

The printed circuit board 90 has a structure in which the wiring patterns from the first layer to the fourth layer, and an insulating resin such as glass epoxy are stacked. In the through hole N1, the wiring pattern on the first layer including the terminal Out is connected to one end of the feedback wiring pattern Fbl which is formed of the wiring pattern on the third layer via a through hole.

Since a wiring pattern which is connected to the terminal Out (feedback wiring pattern Fbl) via the through hole N1 is not present on the second layer, the wiring pattern on the ground of the second layer is patterned so as not to be in contact with a penetrating portion of the through hole N1 in a region Na (also refer to FIG. 13).

The other end of the feedback wiring pattern Fbl is connected to one end of the resistor R4 and one end of the capacitor C12 in the wiring pattern on the first layer, via the through hole N2, in FIG. 17. A sectional structure of the through hole N2 is not illustrated, since the structure is approximately the same as that in the through hole N1. As illustrated in FIG. 13, the wiring pattern on the ground of the second layer is patterned so as not to be in contact with a penetrating portion of the through hole N2 in a region Nb.

Two paths of paths from the terminal Out to the pin Vfb, and to the pin Ifb are provided as feedback paths in the driving circuit 50. In these feedback paths, the feedback wiring pattern Fbl is a wiring pattern which is shared in the above described two paths, and is a wiring pattern which is formed of the third layer from the through hole N1 to the through hole N2.

The through holes N1 and N2, and the like, are not one in practice, and as is understood by referring to FIG. 12, or the like, there are plurality of holes, and in a case of the through holes N1 and N2, there are four holes; however, when considering these in terms of functionality, it is meaningless to distinguish the holes one by one. For this reason, for the through holes which will be described below, there is a case in which the plurality of through holes are referred to, without being distinguished, by being collected.

As illustrated in FIG. 14, the feedback wiring pattern Fbl on the third layer is surrounded with a wiring pattern on the ground. When planarly viewing the feedback wiring pattern Fbl on the third layer, both of the wiring patterns on the second layer (refer to FIG. 13) and the fourth layer (refer to FIG. 15) which are overlapped with the feedback wiring pattern Fbl, when planarly viewed, are set to the ground.

For this reason, the feedback wiring pattern Fbl is not only being shielded, using the ground wiring pattern along a planar direction of the board using the same wiring pattern on the third layer, and is also shielded, using the ground wiring pattern along the vertical direction of the board using the wiring patterns on the second layer and the fourth layer.

Meanwhile, in the circuit diagram in FIG. 10, the driving signal is fed back to the pins Vfb and Ifb of the LSI 500, by being divided into two systems from the terminal Out; however, in practice, as illustrated in FIG. 17, the driving signal is guided by the feedback wiring pattern Fbl via the through hole N1 from the terminal Out on the first layer, is guided to the first layer again via the through hole N2 near the LSI 500, and is branched to one end of the resistor R4 and one end of the capacitor C22. In these, a path on the resistor R4 side is fed back to the pin Vfb, and a path on the capacitor C22 side is fed back to the pin Ifb.

A region on the branching path to the pin Vfb in which the resistor R4 is disposed is surround with the ground pattern on the first layer. A ground pattern is also inserted between terminals on one end and the other end of the resistor R4. The same is applied to the resistor R23 which pulls up the pin Vfb, a disposing region is surrounded with the ground pattern, and the ground pattern is inserted between terminals.

The resistor R32 and the capacitor C20 are present on the branching path to the pin Ifb, in addition to the capacitor C22. Similarly, the region in which these elements are disposed is also surrounded with the ground pattern, and the ground pattern is inserted between terminals.

Since the other end of the resistor R5 and the capacitor C58 itself is set to a ground, the ground pattern is not inserted between the terminals.

A drain electrode of the transistor M3 is connected to the wiring pattern on the third layer and the wiring pattern on the fourth layer via a through hole N3. In these, the wiring pattern on the third layer is connected to the other end of the resistor R4 using the wiring pattern on the first layer, via a through hole N4.

The other end of the capacitor C12 (pin Sw) is connected to the wiring patterns on the second layer and the fourth layer, respectively, via a through hole N5. These wiring patterns on the second layer and the fourth layer are connected to the source electrode of the transistor M3, and a drain electrode of the transistor M4 on the first layer via a through hole N6. In FIG. 15, the wiring pattern on the fourth layer which is connected to the other end of the capacitor C12 via the through hole N5 is connected to one end of the inductor L2 on the first layer via a through hole N7.

For this reason, the through holes N5 and N6 are connected in parallel therebetween using the wiring patterns on the second layer and the fourth layer, and the through holes N6 and N7 is singly connected therebetween using the wiring pattern on the fourth layer.

One end of the thermistor Tha is connected to one end of the temperature wiring pattern Thl as the wiring pattern on the second layer via a through hole N11. Here, in the wiring patterns on the third layer, a wiring pattern to which a voltage Vh is applied, that is, a wiring pattern which is connected to the through hole N3 is patterned so as not to be in contact with a penetrating portion of the through hole N11 in a region Nc, as illustrated in FIG. 14. Similarly, in the wiring patterns on the fourth layer, also a wiring pattern to which the voltage Vh is applied is patterned so as not to be in contact with the penetrating portion of the through hole N11 in a region Nd.

A diagram which illustrates a sectional structure of the through hole N11 will be omitted, since the structure can be analogized from the above description, or a structure of the above described through hole N1 (FIG. 19).

The other end of the temperature wiring pattern Thl is omitted in FIGS. 13 and 17; however, the other end is connected to the control section 100 which is located on the left side in these figures. When describing the temperature wiring pattern Thl on the second layer in detail, the wiring pattern passes through a mounting region of the LSI 500 from the through hole N11, and is guided to the control section 100, without intersecting the feedback wiring pattern Fbl on the third layer when viewed planarly (refer to FIGS. 13, 14, and 17).

In the driving circuit 50, a spike current of approximately several amperes flows on the ground through the capacitor C10 from the terminal Out as an output, when the transistors M3 and M4 are turned on/off (switching). For this reason, noise caused by the spike current is superimposed on the ground.

However, according to the embodiment, the periphery of the feedback wiring pattern Fbl, and the two paths from the through hole N2 which connects the other end of the feedback wiring pattern Fbl to the pins Vfb and Ifb are shielded by the ground. For this reason, since elements on the feedback path and elements of which one end is connected to the feedback path are operated based on the ground, an influence of the noise is reduced. Accordingly, in the embodiment, it is possible to reduce a possibility of causing an erroneous operation due to an influence of the noise, generate the driving signal COM-A with high accuracy with respect to the signal Aa as a target signal, and output the driving signal.

For the driving circuit 50, a driving circuit which generates the driving signal COM-A has been described as an example; however, the same circuit is adopted for the driving circuit 50 which generates the driving signal COM-B. In the driving circuit 50 which generates the driving signal COM-B, as a part thereof is illustrated in FIGS. 12 to 15 in the printed circuit board, the driving circuit 50 which generates the driving signal COM-A is configured by using a pattern which is symmetric (except for part of wiring pattern or through hole) based on a virtual straight line E (refer to FIGS. 16, 17, and 18) which extends by connecting the pins 13 and 36 of the LSI 500. The thermistor which detects a peripheral temperature of the transistor is similarly provided also in the driving circuit 50 which generates the driving signal COM-B.

In a case in which the LSI 500 outputs a gate signal for the driving signal COM-B, not only the driving signal COM-A, for example, the data items dA and dB are input to the DO to D9, for example, using time division.

Incidentally, as described above, in a case in which dots of different sizes are formed on the medium P, it is necessary to increase the ink ejecting frequency f in order to make time for ejecting ink droplets once short. When the ink ejecting frequency f is increased, a switching frequency of the transistors M3 and M4 increases, and it is necessary to provide a countermeasure for heat generation of the transistors M3 and M4.

According to the embodiment, in a case in which a peripheral temperature of the transistor M3 is detected by the thermistor Tha, and it is determined that the detected temperature is a threshold value or more, the control section 100 performs the following process, for example. In detail, the control section 100 instructs a stop using the control signal S with respect to the two driving circuits 50, respectively, and informs of the fact.

When the stop using the control signal S is instructed, since the gate drivers 533 and 534 perform outputting by setting an output to the L level, regardless of an input, both of the transistors M3 and M4 are forcibly turned off. In this manner, overheating of the transistors M3 and M4 is prevented, and elements are not destroyed. In addition, as an example of informing of the stop, there is a generation of an alarm sound, a display of warning, or the like.

In a case in which it is determined that a peripheral temperature of the transistor is the threshold value or more, the control section 100 may execute the following process, for example, instead of a stop of printing. In detail, the control section 100 may reduce a load of the transistors M3 and M4 by decreasing the ink ejecting frequency f (increasing printing cycle Ta), and decreasing a printing speed. In addition, when decreasing the printing speed, a reading interval of the data items dA and dB may be set to be long in accordance with the printing cycle Ta, the frequency of the control signals LAT and CH may be decreased, and the movement speed v may be decreased (rotating speed of carriage motor 31 is decreased).

The invention is not limited to the above described embodiment, and it is possible to adopt various modifications which will be described below, for example. It is also possible to adopt one modification which is arbitrarily selected, or appropriately combine a plurality of modifications, in the various modifications which will be described below.

In the embodiment, the driving circuit 50 has a configuration in which the driving signal COM-A (COM-B) which is obtained by planarizing an amplified-modulated signal using the low pass filter is fed back, when generating a modulated signal Ms; however, the modulated signal Ms itself may be fed back. For example, though it is not particularly illustrated, it may be a configuration in which an error between the modulated signal Ms and the input signal As is calculated, a signal in which the error is delayed and a signal Aa as a target are added or subtracted, and a result thereof is input to the comparator 520.

Since the amplified-modulated signal which appears in the connecting point (pin Sw) of the transistors M3 and M4 is different from the modulated signal Ms only in logical amplitude, it may be a configuration of feeding back the amplified-modulated signal similarly to the modulated signal Ms, after attenuating the amplified-modulated signal, for example.

The printed circuit board 90 is set to four layers; however, the layer may be, for example, six layers, other than four layers. In a case in which the printed circuit board 90 is set to six layers, it may have a configuration in which the feedback wiring pattern Fbl is formed of four layers, is surrounded with a ground pattern, for example, and a third layer and a fifth layer are set to ground patterns. The temperature wiring pattern Thl may be formed on the same layer as the feedback wiring pattern Fbl under a condition that the temperature wiring pattern dose not intersect the feedback wiring pattern Fbl, when planarly viewed. In this case, the second layer and the sixth layer may be set to the ground pattern, in addition to the third layer and the fifth layer.

The thermistor Tha may directly detect a temperature of the transistor M3 by being attached in a state of being in contact with the transistor M3, not a peripheral temperature of the transistor M3, or a detecting target may be the transistor M4, not M3, or may be both of the transistors M3 and M4.

The LSI 500 has a configuration of corresponding to two channels of the driving signals COM-A and COM-B in one package; however, it may be a configuration of an individual package in each channel.

According to the embodiment, a configuration in which the driving signals COM-A and COM-B of two systems which are individually generated by the two driving circuits 50 are selected by the selecting unit 230 (or, not selected), and are supplied to one end of the piezoelectric element 60 is adopted; however, it may be a configuration in which, for example, four trapezoidal waveforms are repeated in a driving signal of one system, any one, or a plurality of waveforms are combined according to a size of a dot which is regulated in the data signal Data, and is supplied to one end of the piezoelectric element 60.

It is not necessary to align the transistors M3 and M4 as N-channel transistors, and for example, the transistor M3 on the high side may be set to a P-channel transistor, and both of the transistors may be set to a P-channel transistor.

A printing apparatus has been exemplified as the liquid ejecting apparatus in the embodiment; however, the apparatus may be a three-dimensional modeling apparatus (so-called 3D printer) which performs three-dimensional modeling by ejecting liquid, a textile printing apparatus which dyes cloth by ejecting liquid, or the like.

The piezoelectric element 60 has been exemplified as a driving target of the driving circuit 50; however, when considering the driving circuit 50 separately from the printing apparatus, as the driving target, all of loads which include capacitive components such as an ultrasonic motor, a touch panel, an electrostatic speaker, a liquid crystal panel, for example, can be applied, without being limited to the piezoelectric element 60.

What is claimed is:

1. A liquid ejecting apparatus comprising:
   a modulation circuit which generates a modulated signal obtained by performing pulse modulation with respect to a source signal;
   a transistor which generates an amplified-modulated signal by amplifying the modulated signal;
   a low pass filter which generates a driving signal by planarizing the amplified-modulated signal;
   a piezoelectric element which is displaced when being applied with the driving signal;
   a cavity of which an internal volume varies due to displacement of the piezoelectric element;
   a nozzle which is provided in order to cause liquid in the cavity to be ejected according to a change in the internal volume of the cavity;
   a thermistor which is provided in order to detect a temperature of the transistor;
   a control section which controls printing according to the temperature which is detected by the thermistor; and
   a multilayered circuit board on which the modulation circuit, the transistor, and the low pass filter are mounted,
   wherein the modulation circuit generates the modulated signal by feeding back a signal based on any one of the modulated signal, the amplified-modulated signal, and the driving signal,
   wherein the multilayered circuit board has a multilayer structure of three layers or more including at least one layer other than two surface layers,
   wherein a feedback wiring pattern which feeds back any one of the modulated signal, the amplified-modulated signal, and the driving signal to the modulation circuit is provided on the one layer, and
   wherein a temperature wiring pattern which electrically connects the thermistor and the control section does not intersect the feedback wiring pattern when viewed planarly.

2. The liquid ejecting apparatus according to claim 1, wherein a frequency of the modulated signal is 1 MHz or more and 8 MHz or less.

3. The liquid ejecting apparatus according to claim 1, wherein an upper layer or a lower layer of the feedback wiring pattern is a ground pattern.

4. The liquid ejecting apparatus according to claim 1, wherein the feedback wiring pattern is surrounded with a ground pattern in the one layer.

* * * * *